(12) United States Patent
Fischer et al.

(10) Patent No.: US 7,377,546 B2
(45) Date of Patent: *May 27, 2008

(54) AIR BAG MODULE WITH VENT CONTROLLED BY TETHER

(75) Inventors: Kurt F. Fischer, Leonard, MI (US); William P. Braun, Romeo, MI (US); Alex G. Meduvsky, Romeo, MI (US); John P. Wallner, Rochester Hills, MI (US); Joseph J. Zwolinski, Sterling Heights, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/046,180

(22) Filed: Jan. 28, 2005

(65) Prior Publication Data

US 2005/0127648 A1    Jun. 16, 2005

Related U.S. Application Data

(63) Continuation-in-part of application No. 10/878,577, filed on Jun. 28, 2004, now Pat. No. 6,959,945, which is a continuation-in-part of application No. 10/244,933, filed on Sep. 16, 2002, now Pat. No. 7,083,191.

(51) Int. Cl.
*B60R 21/30* (2006.01)
*B60R 21/16* (2006.01)
*B60R 21/26* (2006.01)

(52) U.S. Cl. .................. 280/739; 280/736; 280/742; 280/743.2

(58) Field of Classification Search ............... 280/739, 280/743.2, 736, 742
See application file for complete search history.

(56) References Cited

U.S. PATENT DOCUMENTS

| 5,246,250 | A |   | 9/1993  | Wolanin et al. |
| 5,366,242 | A | * | 11/1994 | Faigle et al. ............... 280/736 |
| 5,405,166 | A |   | 4/1995  | Rogerson |
| 5,489,119 | A |   | 2/1996  | Prescaro et al. |

(Continued)

FOREIGN PATENT DOCUMENTS

DE    19754280    7/1998

(Continued)

*Primary Examiner*—Ruth Ilan
*Assistant Examiner*—Joselynn Y. Sliteris
(74) *Attorney, Agent, or Firm*—Tarolli, Sundheim, Covell & Tummino LLP

(57) ABSTRACT

A vehicle occupant protection apparatus (10*d*) includes an inflatable occupant protection device (300) and a support member (316). A vent opening (350) extends through the support member (316). A vent member (360) is associated with the vent opening (350). The vent member (360) initially closes the vent opening (350). Inflation fluid moves the vent member (360) relative to the support member (316) for enabling a flow of inflation fluid through the vent opening (350). A tether (386) extends between the inflatable occupant protection device (300) and the vent member (360). The tether (386) is responsive to inflation of the inflatable occupant protection device (300) away from the support member (316) by more than a predetermined distance for moving the vent member (360) relative to the support member (316) for reducing the flow of inflation fluid through the vent opening (350).

25 Claims, 12 Drawing Sheets

U.S. PATENT DOCUMENTS

| | | | |
|---|---|---|---|
| 5,501,488 A | 3/1996 | Saderholm et al. | |
| 5,524,925 A * | 6/1996 | Rose et al. | 280/739 |
| 5,762,367 A | 6/1998 | Wolanin | |
| 5,799,974 A | 9/1998 | Honda | |
| 6,017,056 A | 1/2000 | Lee | |
| 6,095,557 A | 8/2000 | Takimoto et al. | |
| 6,131,942 A | 10/2000 | Fujii et al. | |
| 6,161,866 A | 12/2000 | Ryan et al. | |
| 6,206,408 B1 | 3/2001 | Schneider | |
| 6,273,463 B1 * | 8/2001 | Peterson et al. | 280/739 |
| 6,371,517 B1 | 4/2002 | Webber et al. | |
| 6,648,371 B2 | 11/2003 | Vendely et al. | |
| 6,959,945 B2 * | 11/2005 | Fischer et al. | 280/739 |
| 2003/0155756 A1 | 8/2003 | Hawthorn et al. | |
| 2003/0189326 A1 | 10/2003 | Short et al. | |
| 2005/0040634 A1* | 2/2005 | Braun et al. | 280/742 |
| 2005/0104347 A1 | 5/2005 | Hawthorn et al. | |
| 2005/0146122 A1* | 7/2005 | Gould et al. | 280/739 |
| 2005/0248137 A1* | 11/2005 | Delventhal et al. | 280/739 |
| 2006/0125221 A1* | 6/2006 | Schneider et al. | 280/742 |
| 2006/0290117 A1* | 12/2006 | Fischer et al. | 280/739 |

FOREIGN PATENT DOCUMENTS

| | | |
|---|---|---|
| DE | 19703945 | 8/1998 |
| DE | 19912369 | 10/2000 |
| DE | 10139626 | 3/2003 |
| DE | 10316026 | 10/2003 |
| DE | 10339031 | 3/2004 |
| EP | 0332325 | 9/1989 |
| EP | 1112902 | 7/2001 |
| EP | 1165349 | 1/2002 |
| EP | 1338480 | 8/2003 |
| GB | 2338214 | 12/1999 |
| WO | 9831570 | 7/1998 |
| WO | 03016106 | 2/2003 |

* cited by examiner

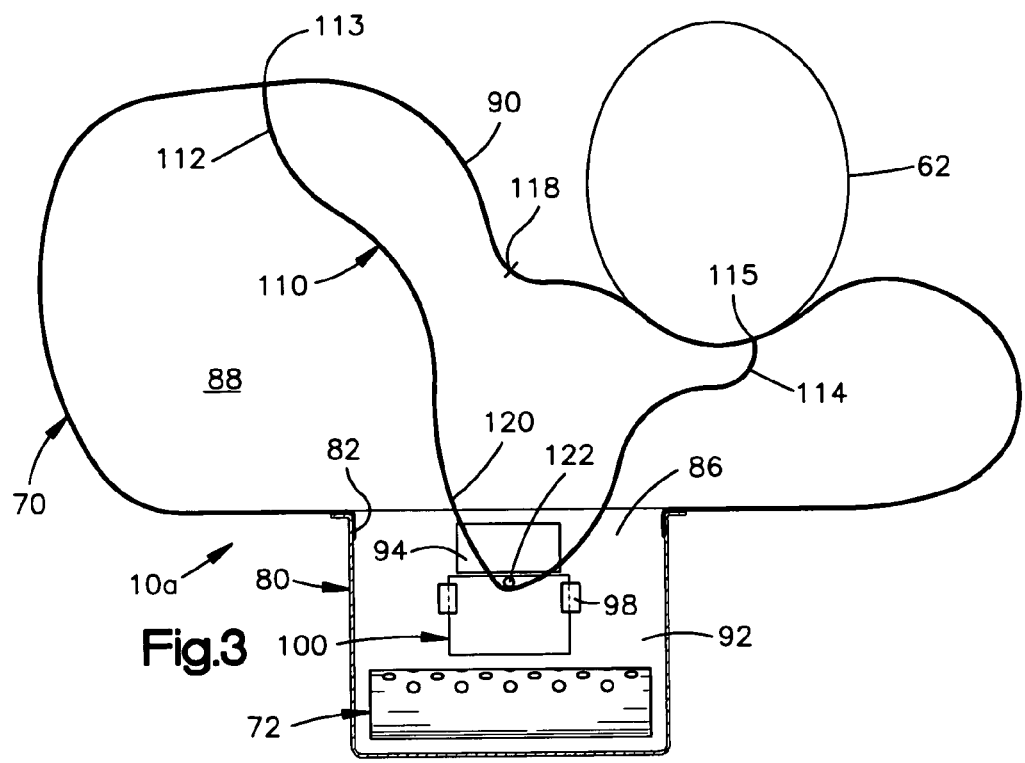
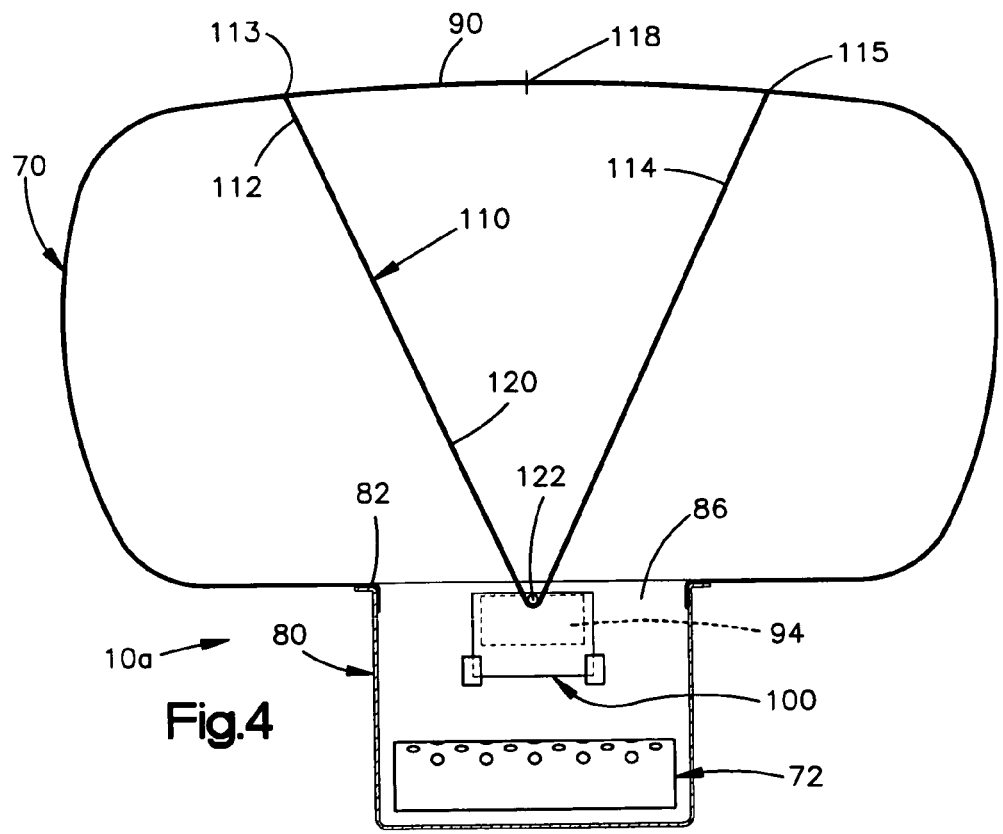

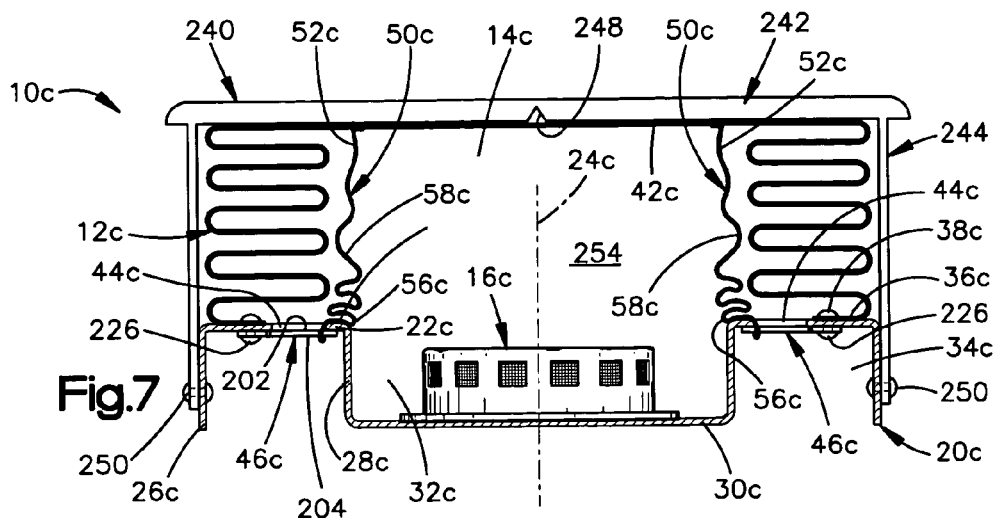
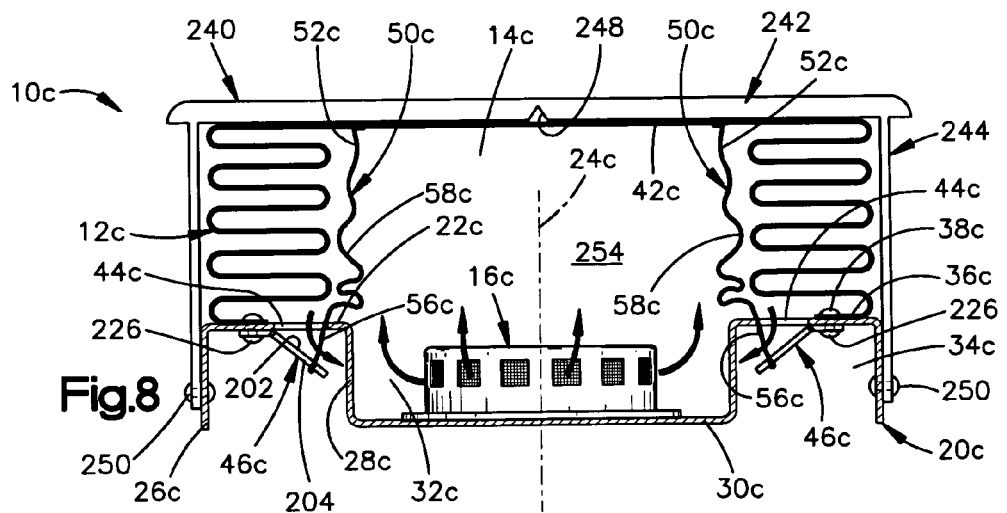
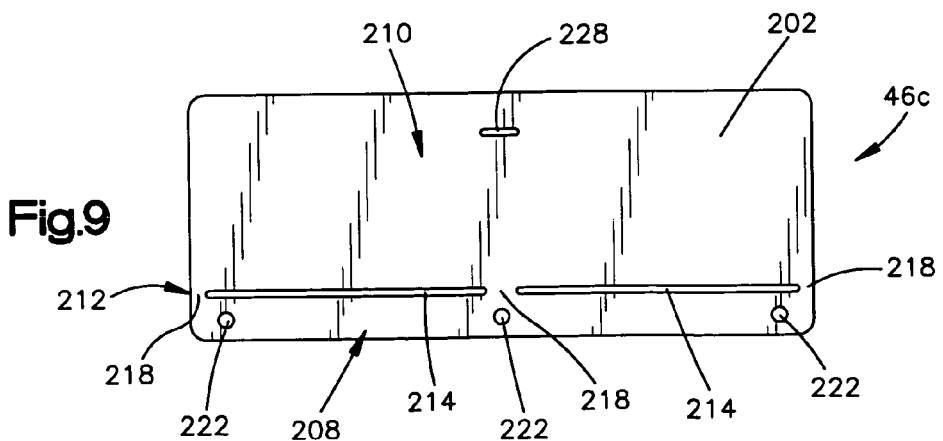

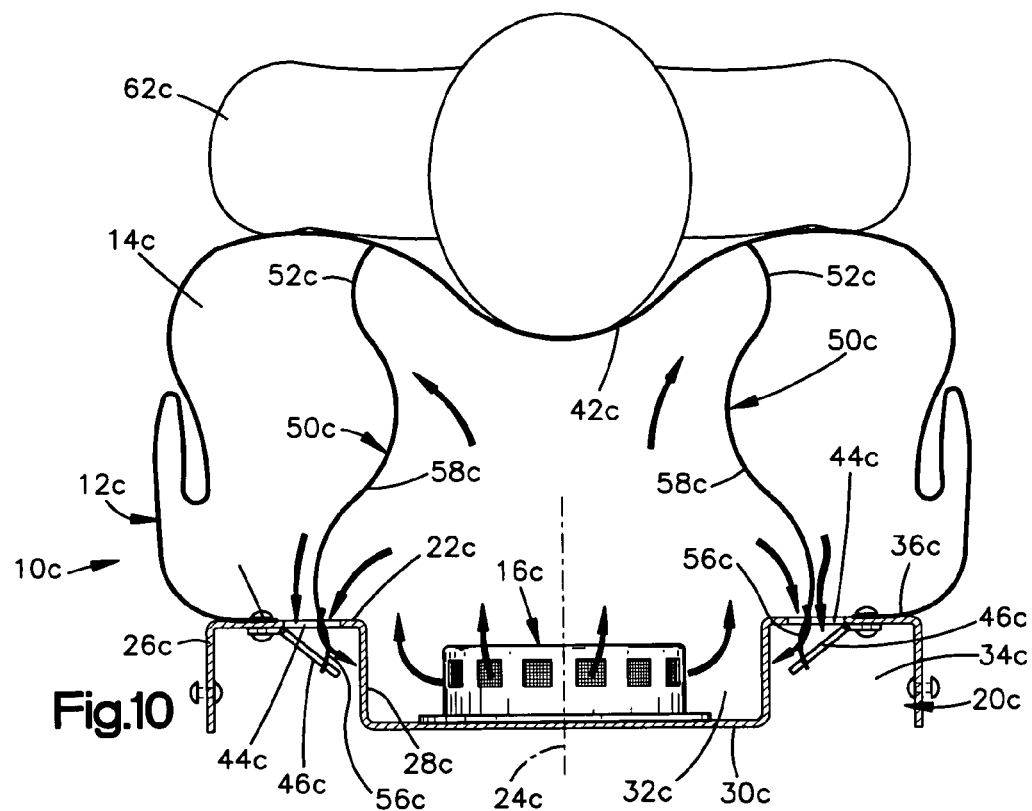
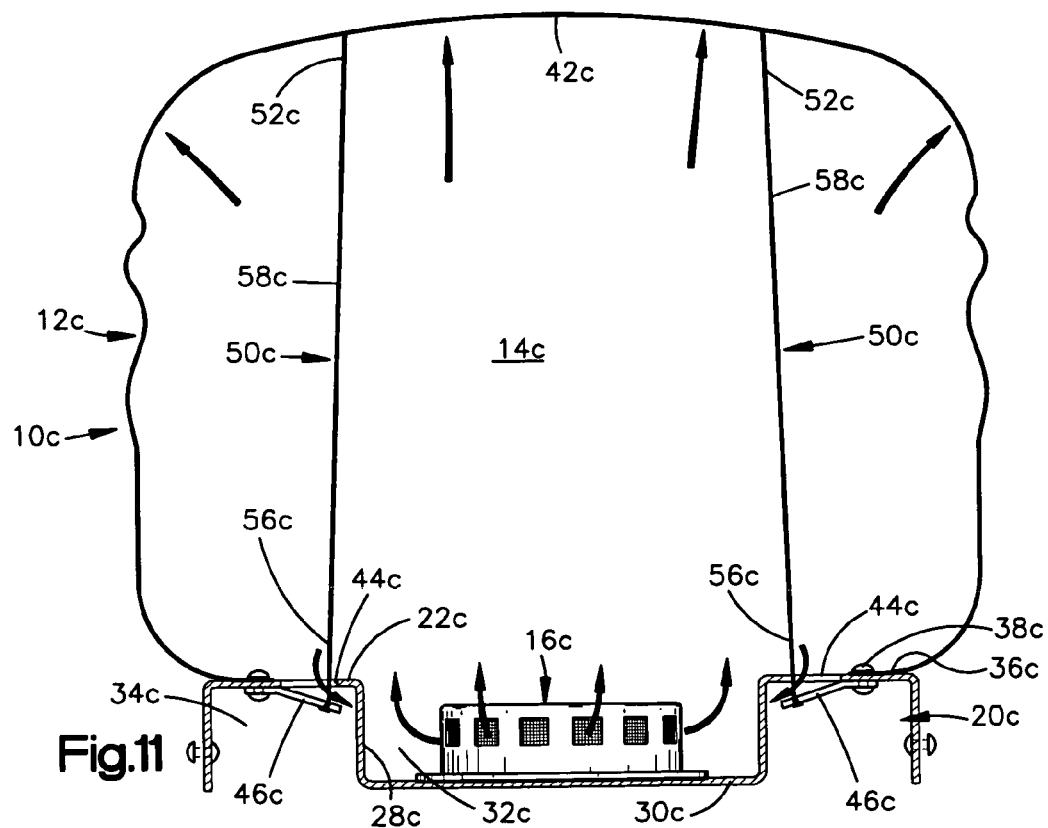

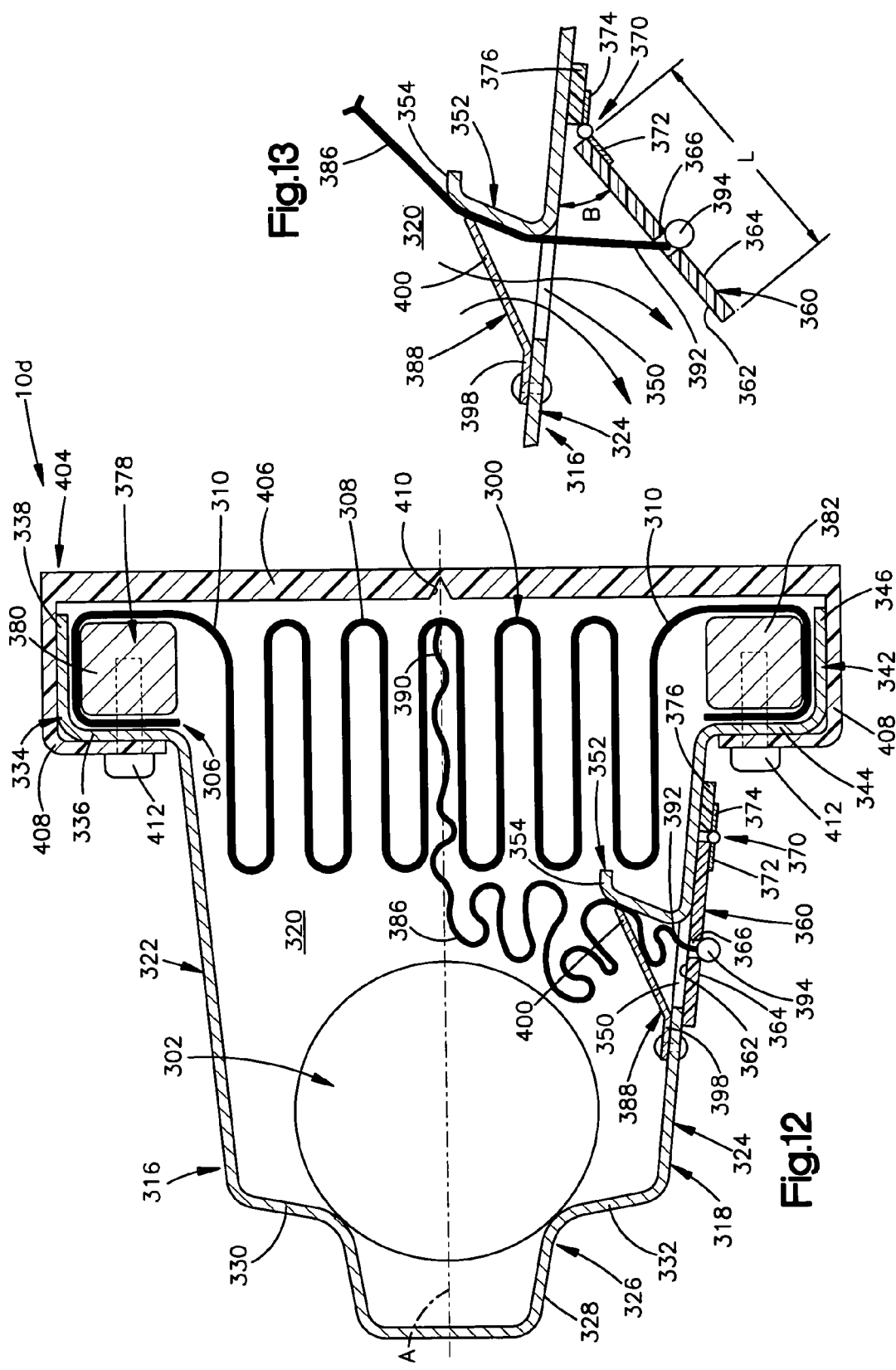

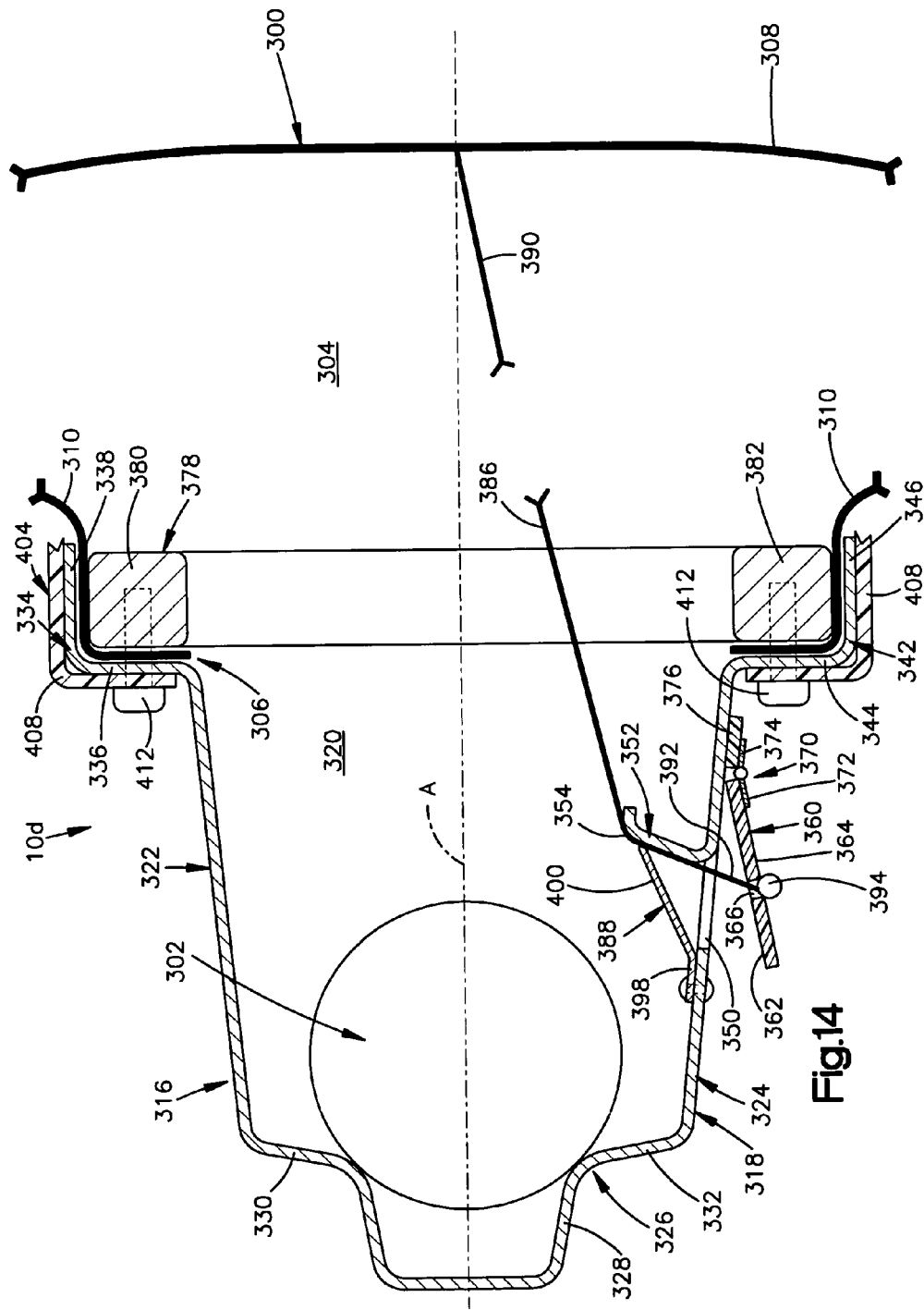

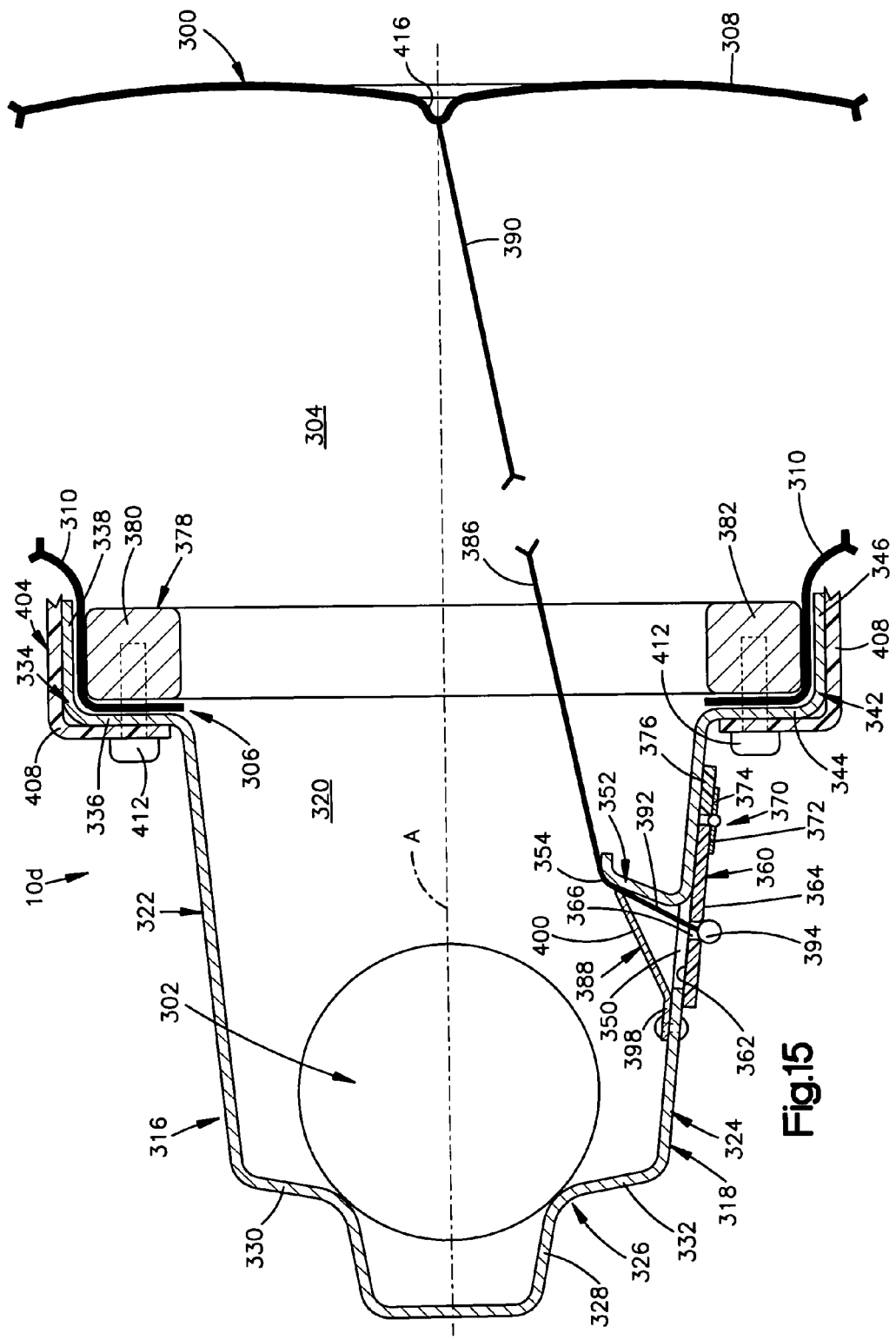

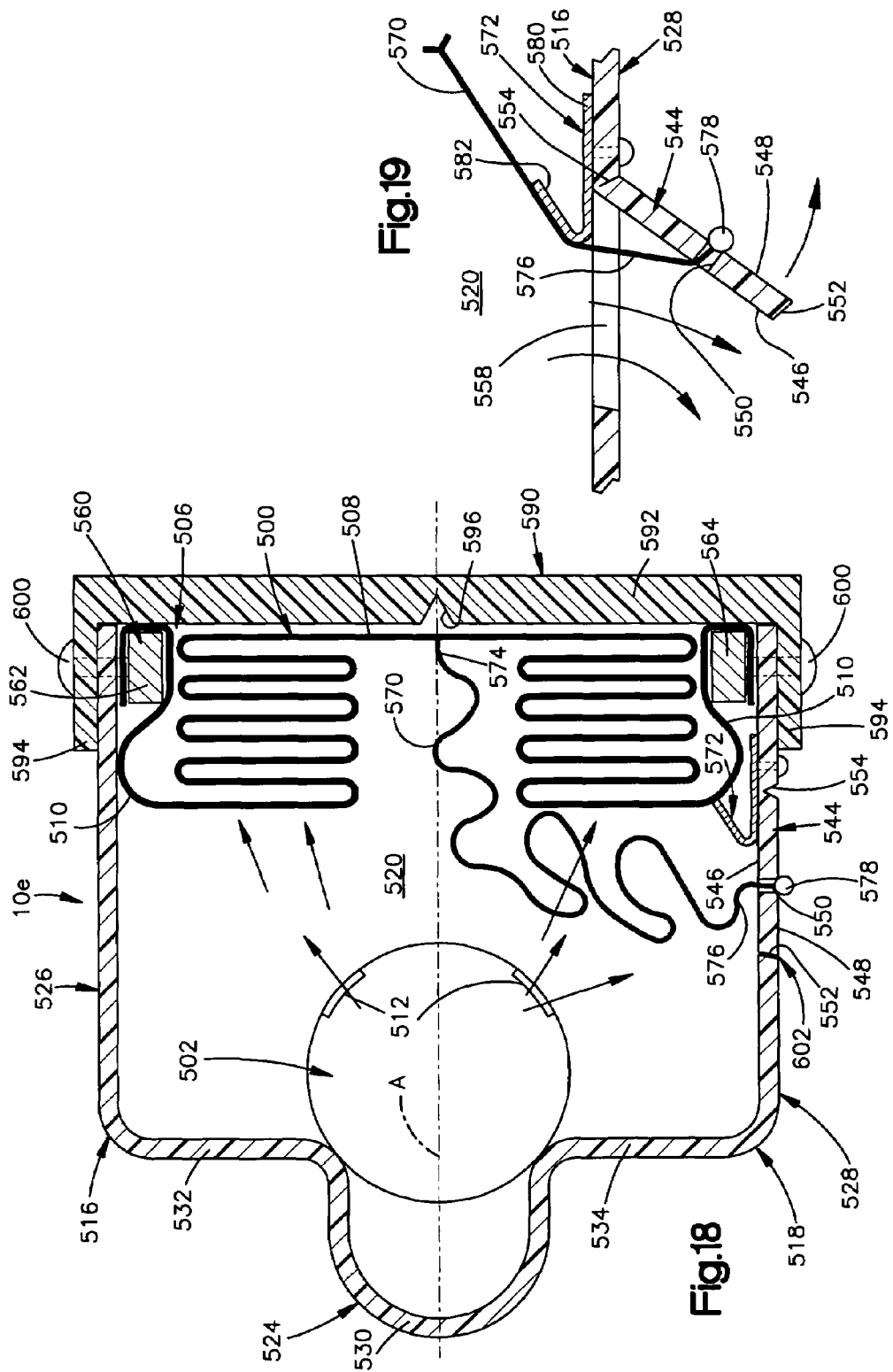

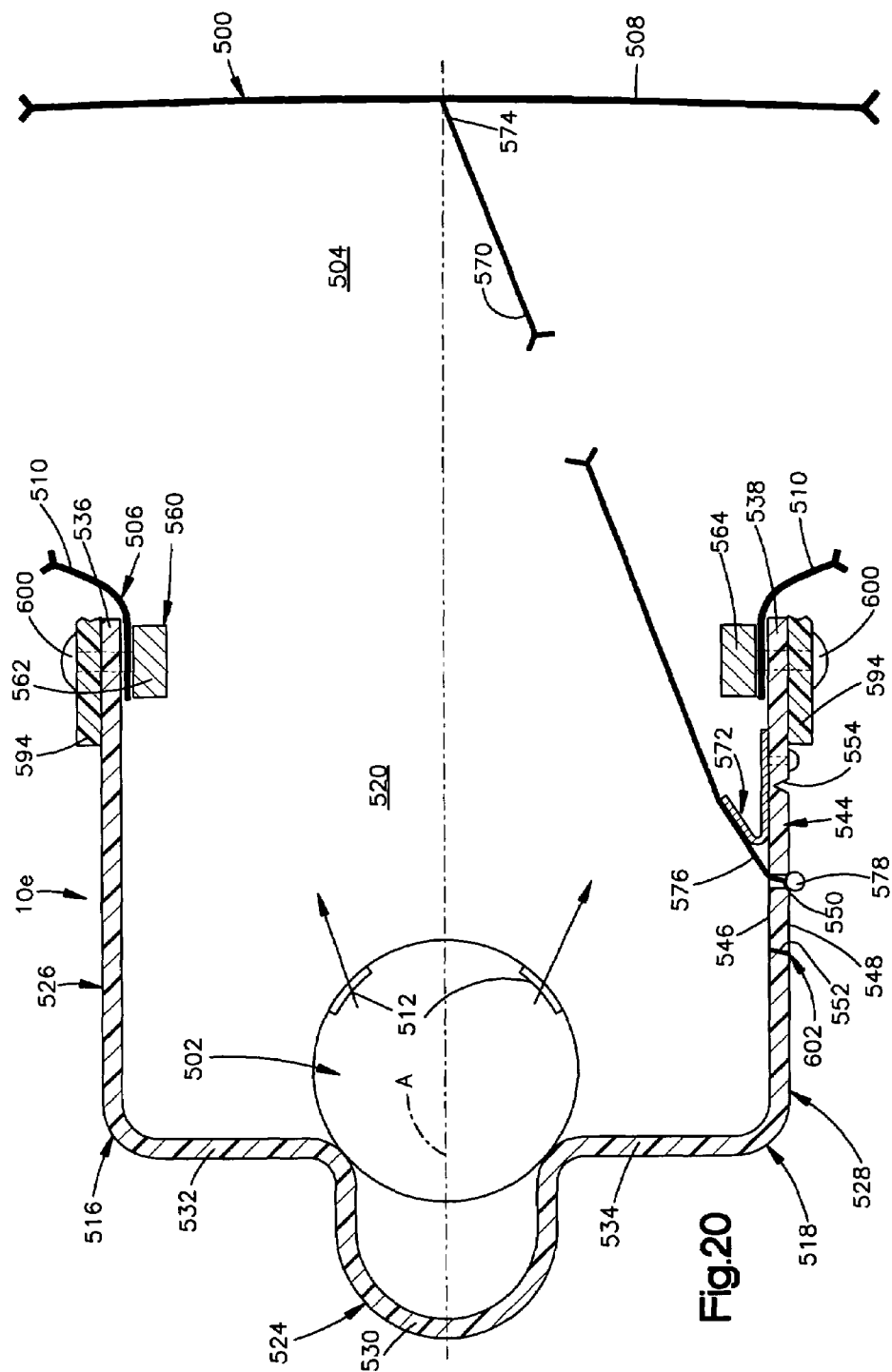

AIR BAG MODULE WITH VENT CONTROLLED BY TETHER

RELATED APPLICATIONS

This application is a continuation-in-part of patent application Ser. No. 10/878,577, filed Jun. 28, 2004, now U.S. Pat. No. 6,959,945 which is a continuation-in-part of patent application Ser. No. 10/244,933, filed Sep. 16, 2002 now U.S. Pat. No. 7,083,191.

TECHNICAL FIELD

The present invention relates to a vehicle occupant protection apparatus. In particular, the present invention relates to an air bag module having a vent that is moved between an open condition and a closed condition by a tether of an air bag.

BACKGROUND OF THE INVENTION

It is known to provide an air bag with a vent. The vent is operative, when the air bag inflates to help protect a vehicle occupant, to discharge inflation fluid from the air bag. In some air bags, the vent may be selectively opened depending on sensed factors, for example, whether the occupant's seat belt is buckled. In other air bags, such as the one shown in U.S. Pat. No. 5,405,166, the vent is formed as two openings that are initially aligned so that the vent is initially open and then closes after the internal bag pressure reaches a predetermined amount. U.S. Pat. No. 5,246,250 shows an air bag that includes a tether attached to a valve flap panel to open or close a vent opening in the air bag when the air bag is inflated and the tether is actuated.

SUMMARY OF THE INVENTION

The present invention relates to a vehicle occupant protection apparatus comprising an inflatable occupant protection device and a support member. A vent opening extends through the support member. The vehicle occupant protection apparatus also includes an inflator that is actuatable for providing inflation fluid for inflating the inflatable occupant protection device. A vent member is associated with the vent opening. The vent member initially closes the vent opening. Inflation fluid provided by the inflator moves the vent member relative to the support member for enabling a flow of inflation fluid through the vent opening. The vehicle occupant protection apparatus also includes a tether that extends between the inflatable occupant protection device and the vent member. The tether is responsive to inflation of the inflatable occupant protection device away from the support member by more than a predetermined distance for moving the vent member relative to the support member for reducing the flow of inflation fluid through the vent opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a sectional view of a portion of a vehicle occupant protection apparatus and a vent in accordance with a second embodiment of the present invention, with the vent being open;

FIG. 4 is a view similar to FIG. 3 showing the protection apparatus with the vent closed;

FIG. 7 is a sectional view of a vehicle occupant protection apparatus and a vent in accordance with a fourth embodiment of the present invention, with the vent in a first condition;

FIG. 8 is a view similar to FIG. 7 showing the protection apparatus with the vent in a second condition;

FIG. 9 illustrates a vent member for use with the vehicle occupant protection device of FIG. 7;

FIG. 10 illustrates the vehicle occupant protection apparatus of FIG. 7, with the air bag being partially inflated and the vent in the second condition;

FIG. 11 illustrates the vehicle occupant protection apparatus of FIG. 7, with the air bag being near full expansion and the vent being moved from the second condition toward the first condition;

FIG. 12 is a sectional view of a vehicle occupant protection apparatus and a vent in accordance with a fifth embodiment of the present invention, with the vent in a first condition;

FIG. 13 is an enlarged view of a portion of the vehicle occupant protection apparatus of FIG. 12 with the vent in a second condition;

FIG. 14 illustrates the vehicle occupant protection apparatus of FIG. 12, with the air bag being near full expansion and the vent being moved from the second condition toward the first condition;

FIG. 15 illustrates the vehicle occupant protection apparatus of FIG. 12, with the air bag fully expanded and the vent returned to the first condition;

FIG. 18 illustrates the vehicle occupant protection apparatus of FIG. 17, with after initial actuation of the inflator and with the vent in the first condition;

FIG. 19 is an enlarged view of a portion of the vehicle occupant protection apparatus of FIG. 17, with the vent in a second condition; and FIG. 20 illustrates the vehicle occupant protection apparatus of FIG. 17, with the air bag fully expanded and the vent returned to the first condition.

DETAILED DESCRIPTION OF THE INVENTION

The present invention relates to a vehicle occupant protection apparatus. In particular, the present invention relates to an air bag module having a vent that is moved between an open condition and a closed condition by a tether of an air bag.

Figure 1:
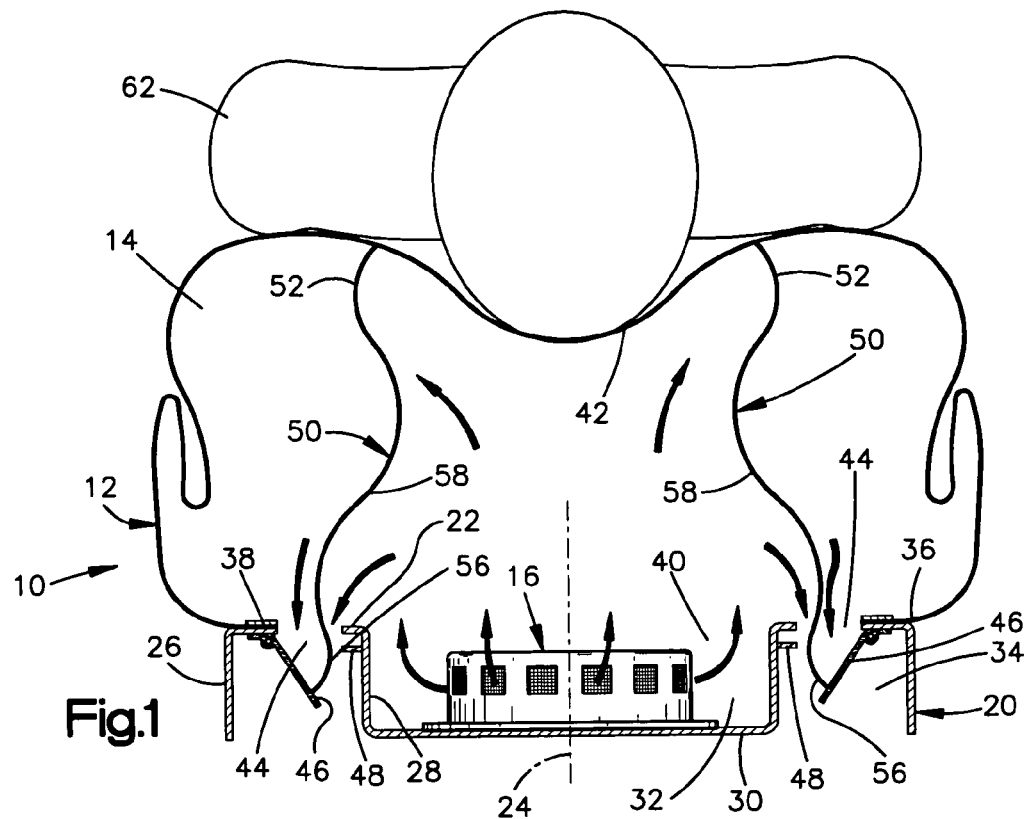
FIG. 1 is a sectional view of a portion of a vehicle occupant protection apparatus including an inflatable driver side protection device and a vent in accordance with the present invention, with the vent being open.

As representative of the invention, FIG. 1 illustrates schematically an air bag module 10 that includes an inflatable occupant protection device in the form of an air bag 12. Other vehicle occupant protection devices that can be used in accordance with the invention include, for example, inflatable seat belts, inflatable knee bolsters, inflatable head liners, inflatable side curtains, and knee bolsters operated by inflatable air bags.

Figure 2:
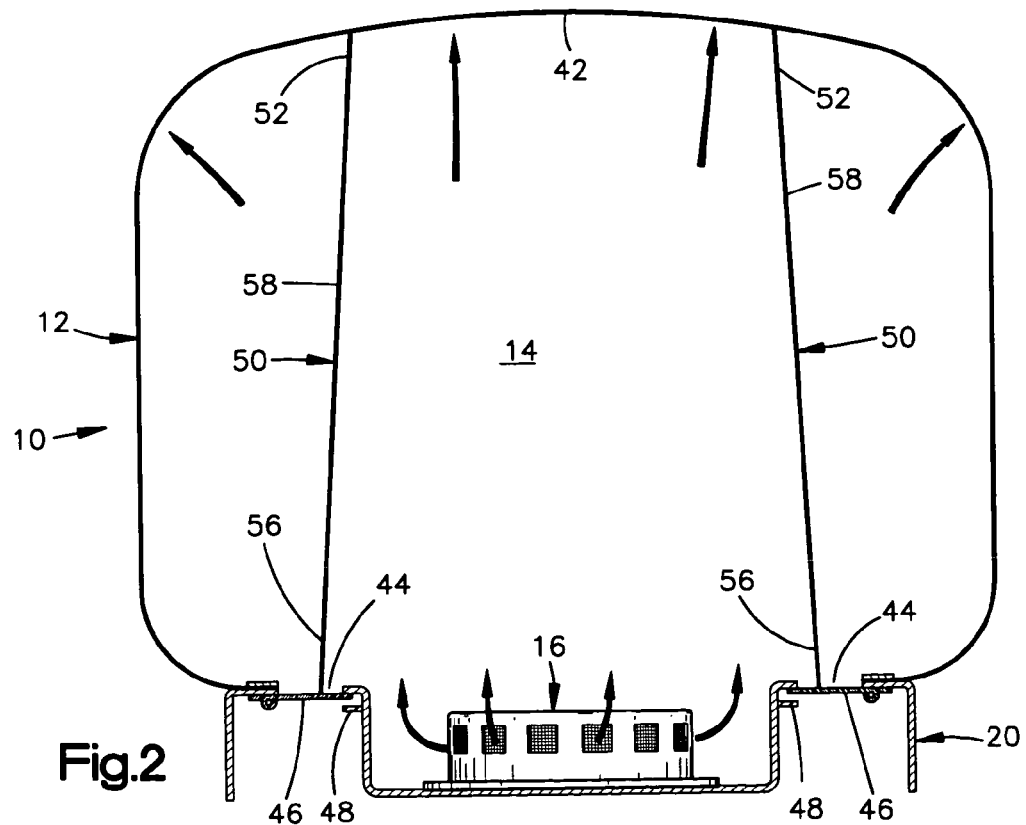
FIG. 2 is a view similar to FIG. 1 showing the protection apparatus with the vent closed.

The air bag 12 is preferably made from a flexible fabric material, such as woven nylon, and has an inflation fluid volume 14. The air bag 12 can alternatively be made from a non-woven material, such as plastic film. The air bag 12, when inflated, has a configuration similar to that illustrated in FIG. 2. The air bag 12 of FIGS. 1 and 2 is designed for a driver side application. The invention is applicable to air bags that are used in other locations, for example, passenger side air bags as described below with reference to FIGS. 5 and 6, or side impact air bags.

The module 10 includes an inflator 16 for inflating the air bag 12. The inflator 16 may contain a stored quantity of pressurized inflation fluid and an ignitable material for heating the inflation fluid. The module 10 alternatively could include an inflator 16 that uses the combustion of gas generating material to generate inflation fluid in the form of gas to inflate the air bag 12, or an inflator that contains only a stored quantity of pressurized inflation fluid for inflating the air bag.

The inflator 16 and the air bag 12 are supported on a support member 20. The support member 20 is a member or assembly that is fixed in position on the vehicle, that supports the inflator 16 and the air bag 12, and that receives the reaction forces of the inflator and the air bag when the inflator is actuated. In the illustrated embodiment, the support member 20 is a reaction plate.

The reaction plate 20 is a single piece of material, such as metal or high strength plastic, that is formed to the illustrated configuration. The reaction plate 20 has an annular main body portion 22 centered on an axis 24. A cylindrical rim or outer wall 26 of the reaction plate 20 extends downward (as viewed in FIG. 1) from the main body portion 22. A cylindrical inner wall 28 of the reaction plate 20 extends downward from the main body portion 22 and parallel to the outer wall 26, at a location spaced radially inward from the outer wall 26. A circular center wall 30 caps the inner wall 28.

The inner wall 28 and the center wall 30 of the reaction plate 20 define a cylindrical inflator mounting chamber 32. The inflator 16 is located in the chamber 32 and is secured to the reaction plate 20 in a manner not shown. The inner wall 28 and the outer wall 26 of the reaction plate 20 define a toroidal vent chamber 34, radially outward of the inflator mounting chamber 32.

A mouth portion 36 of the air bag 12 is secured to the main body portion 22 of the reaction plate 20 by a retainer or retainer ring 38. The mouth portion 36 defines an inflation fluid opening 40 for receiving inflation fluid from the inflator 16. The inflation fluid opening 40 allows inflation fluid to flow from the inflator 16 into the inflation fluid volume 14 of the air bag 12 when the inflator is actuated. Opposite the mouth portion 36, the air bag 12 has an outer panel 42 that is located distant from the reaction plate 20 when the air bag is inflated.

Two diametrically opposed vent openings 44 are formed in the main body portion 22 of the reaction plate 20, radially inward of the mouth portion 36 of the air bag 12. The vent openings 44 are identical to each other, each having a circular configuration. It should be understood that more than two vent openings 44 or fewer than two vent openings can be provided, and at locations different than that shown. Also, each vent opening 44 could have a configuration other than a circular configuration, and if plural vent openings are provided, they could have configurations different from each other.

Because the vent openings 44 are located in the main body portion 22 of the reaction plate 20 radially inward of the mouth portion 36 of the air bag 12, the vent openings are in fluid communication with the inflation fluid volume 14 of the air bag. As a result, at least some of the inflation fluid flowing from the inflator 16, when the inflator is actuated, flows across or into the vent openings 44 in the reaction plate 20.

The module includes two vent members 46 for selectively closing the vent openings 44. Each one of the vent members 46 is associated with a respective one of the vent openings 44. The two vent members 46 are identical in the illustrated embodiment.

Each vent member 46 is configured as a circular door that is supported on the reaction plate 20 for pivotal movement relative to the reaction plate. The door 46 is pivotally mounted to the reaction plate at a location adjacent the mouth portion 36 of the air bag 12. The module 10 includes a latch shown schematically at 48 on the inner wall 28 of the reaction plate 20, adjacent each vent opening 44. The latch 48 may be a spring loaded latch member or a bendable tab on the reaction plate 20, for example.

The door 46 has a first condition shown in FIG. 1 in which the door is spaced apart from the vent opening 44 in the reaction plate 20. When the door 46 is in the first condition, the door is pivoted away from the vent opening 44 and away from the inflation fluid volume 14 of the air bag 12 (downward as viewed in FIG. 1), into the vent chamber 34 in the reaction plate 20. When the door 46 is in the first condition, the vent opening 44 is not blocked, and inflation fluid can flow away from the air bag 12 through the vent opening.

The door 46 has a second condition shown in FIG. 2 in which the door is pivoted upward and overlies the vent opening 44 in the reaction plate. The latch 48 holds the door 46 in the second or closed condition. When the door 46 is in the second condition, the vent opening 44 is blocked and inflation fluid cannot flow away from the air bag 12 through the vent opening.

The module 10 includes one or more tethers 50 for controlling or limiting deployment of the air bag 12. In the illustrated embodiment, two identical tethers 50 are provided. Tethers 50 in accordance with the present invention may take any one of many different forms. In the illustrated embodiment, each tether 50 is a narrow, elongate piece or strip of fabric material having a width of approximately three-eights of an inch. The tether 50 may be made from the same material as the air bag 12, or may be made from a different material. The tether 50 is not, per se, part of the air bag 12, in the sense that the air bag can deploy and inflate whether the tether is present or not.

The tether 50 has a first end portion 52 that is fixed to the outer panel 42 of the air bag 12 by sewing. The first end portion 52 of the tether 50 is thus connected for movement with the air bag 12 as the air bag is deployed.

An opposite second end portion 56 of the tether 50 is connected with or fixed to a vent door 46 for transferring tensile force from the air bag 12 and the tether 50 to the vent door. The second end portion 56 of the tether 50 may be formed as a loop that extends through or around a portion of the door 46 to couple the door for movement with the second end portion of the tether. The second end portion 56 of the tether 50 may be secured to the vent door 46 in another manner, for example, by adhesive. An intermediate portion 58 of the tether 50 extends between and interconnects the first and second end portions 52 and 56.

When the air bag 12 is in a deflated condition (not shown), the outer panel 42 of the air bag is close to or adjacent the mouth portion 36. There is a significant amount of slack in the tether 50. The slack is present because the length of the tether 50 is greater than the distance between the portion of the air bag 12 where the first end portion 52 of the tether is fixed to the outer panel 42 and the portion of the air bag 12 adjacent the second end portion 56 of the tether. In the illustrated embodiment, the slack is provided by the intermediate portion 58 of the tether 50. Because the slack is present, the vent doors 46 are not pulled closed against the reaction plate 20 when the air bag 12 is in the deflated condition, and inflation fluid may be able to flow away from the air bag through the vent openings 44.

If the air bag 12 is to be inflated, an actuation signal is transmitted to the inflator 16. When the inflator 16 is actuated, it emits a large volume of inflation fluid through the mouth portion 36 of the air bag 12 and into the inflation fluid volume 14 of the air bag. The air bag 12 inflates, as shown in FIGS. 1 and 2.

As the air bag 12 inflates, the outer panel 42 of the air bag moves away from the reaction plate 20 and the vent doors 46. If the air bag 12 inflates by less than a certain amount (FIG. 1), the outer panel 42 moves away from the reaction plate 20 by less than a predetermined distance. This might happen, for example, if the air bag 12 when inflating contacts a vehicle occupant (as shown schematically at 62 in FIG. 1) positioned relatively close to the reaction plate 20.

The engagement of the air bag 12 with the relatively close vehicle occupant 62 stops or limits outward movement of the outer panel 42 of the air bag. When this occurs, the tethers 50 are not stretched out sufficiently to remove the slack from the tethers. The tethers 50 do not pull on the vent doors 46, and the vent doors remain in the first condition, spaced apart from the vent openings 44. The vent openings 44 remain open, enabling flow of inflation fluid away from the air bag 12 through the vent openings. This venting of the air bag 12 can reduce the force and pressure with which the air bag inflates.

If the air bag 12 inflates by more than a certain amount (FIG. 2), the outer panel 42 moves away from the reaction plate 20 by a predetermined amount. Such movement might occur if the air bag 12 inflates fully to help protect a vehicle occupant seated against the vehicle seat back. This movement of the outer panel 42 away from the reaction plate 20 by the predetermined amount causes the tethers 50 to be tensioned, as shown in FIG. 2. The distance between the first end portions 52 of the tethers 50 and the second end portions 56 of the tethers increases. The slack is pulled out of the tethers 50 and the tethers pull the vent doors 46 into the second condition or closed condition shown in FIG. 2. The vent openings 44 are closed, blocking flow of inflation fluid away from the air bag 12 through the vent openings. The latches 48 hold the vent doors 46 closed. The air bag 12 inflates with full force and pressure.

FIGS. 3 and 4 illustrate an air bag module 10a in accordance with a second embodiment of the invention. The air bag module 10a is a passenger side frontal air bag module that includes an air bag 70 and an inflator 72 for inflating the air bag. The air bag 70 and the inflator 72 are mounted on a support member 80. In the illustrated embodiment, the support member 80 is a reaction canister mounted in a vehicle instrument panel. The reaction canister 80 could alternatively be part of the instrument panel itself.

A mouth portion 82 of the air bag 70 is secured to the reaction canister 80. The mouth portion 82 defines an inflation fluid opening 86 for receiving inflation fluid from the inflator 72. The inflation fluid opening 86 allows inflation fluid to flow from the inflator 72 into an inflation fluid volume 88 of the air bag 70 when the inflator 72 is actuated. Opposite the mouth portion 82, the air bag 70 has an outer panel 90 that is located distant from the reaction canister 80 when the air bag is inflated.

The reaction canister 80 as shown has a wall 92 that defines a vent opening 94. The vent opening 94 is in fluid communication with the inflation fluid volume 88 of the air bag 70. A door retainer 98 is fixed to the reaction canister 80 adjacent the vent opening 94.

The module 10a includes a vent member 100 for selectively closing the vent opening 94. The vent member 100 is formed as a door supported on the reaction canister 80 at a location adjacent the vent opening 94. The door 100 is supported on the reaction canister 80 for sliding movement relative to the reaction canister. The door retainer 98 and the wall 92 of the reaction canister 80 cooperate to guide the sliding movement of the door 100.

The door 100 has a first condition shown in FIG. 3 in which the door is spaced apart from the vent opening 94 in the reaction canister 80. When the door 100 is in the first condition, the vent opening 94 in the reaction canister 80 is not blocked, and inflation fluid can flow away from the air bag 70 through the vent opening.

The door 100 has a second condition shown in FIG. 4 in which the door overlies the vent opening 94 in the reaction canister 80. When the door 100 is in the second condition, the vent opening 94 is blocked and inflation fluid cannot flow away from the air bag 70 through the vent opening.

The apparatus 10a includes one or more tethers 110 for controlling operation of the vent door 100. In the illustrated embodiment, only one tether 110 is used. The tether 110 has a first part or first end portion 112 that is fixed to a first portion 113 of the outer panel 90 of the air bag 70. An opposite second part or second end portion 114 of the tether 110 is fixed to a second portion 115 of the outer panel 90. Both the first and second portions 113 and 115 of the air bag 70 are offset laterally from the center point 118 of the outer panel 90.

An intermediate portion 120 of the tether 110 extends around a pin 122 or other portion of the vent door 100. The tether 110 may also extend through a tether guide (not shown) fixed to the reaction canister 80. The intermediate portion 120 of the tether 110 is freely slidable relative to the vent door 100 in response to forces applied to one or both end portions 112 and 114 of the tether. As the intermediate portion 120 of the tether 110 moves relative to the vent door 100, the distance between the first end portion 112 of the tether and the vent door varies in inverse relationship to the distance between the second end portion 114 of the tether and the vent door.

When the air bag 70 is in a deflated condition (not shown), the outer panel 90 of the air bag is close to or adjacent the mouth portion 82. There is a significant amount of slack in the tether 110. The vent door 100 is in the first condition as shown in FIG. 3, in which the vent door does not cover the vent opening 94 in the reaction canister. As a result, inflation fluid may be able to flow away from the air bag 70 through the vent opening 94.

When the air bag 70 is inflated, the outer panel 90 of the air bag moves away from the reaction canister 80 and the vent door 100. The first and second end portions 112 and 114 of the tether 110 also move away from the vent door 100.

The air bag 70 might inflate fully without contacting a vehicle occupant or other object during inflation. In that situation, as shown in FIG. 4, the entire outer panel 90 moves fully away from the vent door 100, carrying with it both the first end portion 112 and the second end portion 114 of the tether 110. Each of the first and second end portions 112 and 114 of the tether 110 moves away from the vent door 100 by a substantial distance. As a result of this movement, the combined distances between (a) the first end portion 112 of the tether 110 and the vent door 100 and (b) the second end portion 114 of the tether and the vent door 100 substantially equal the length of the tether 110 between the first and second end portions. The tether 110 is, therefore, stretched out sufficiently to remove its slack.

The tightened tether 110, through the intermediate portion 120 of the tether, pulls on the pin 122. The vent door 100 is pulled from the first condition to the second condition in which it covers the vent opening 94 in the reaction canister 80. The vent opening 94 in the reaction canister 80 closes, blocking flow of inflation fluid away from the air bag 70 through the vent opening. The air bag 70 inflates with full force and pressure.

The inflating air bag 70 might, alternatively, contact a vehicle occupant positioned relatively close to the reaction canister 80 and centered laterally relative to the reaction canister. If this occurs, the engagement of the air bag 70 with the vehicle occupant stops or limits outward movement of the outer panel 90 of the air bag. If the combined distances between (a) the first end portion 112 of the tether 110 and the vent door 100 and (b) the second end portion 114 of the tether and the vent door substantially equal the length of the tether between the first and second end portions, as described above, then the tether is stretched out sufficiently to remove its slack. The vent door 100 is moved from the open condition to the closed condition, blocking flow of inflation fluid away from the air bag 70 through the vent opening 94.

In another alternative deployment scenario, the combined distances between (a) the first end portion 112 of the tether 110 and the vent door 100 and (b) the second end portion 114 of the tether and the vent door might not substantially equal the length of the tether between the first and second end portions. In this case, the tether 110 is not stretched out sufficiently to remove its slack. The tether 110 does not exert sufficient force on the vent door 100 to move the vent door from the first condition to the second condition.

An example of this deployment scenario is shown in FIG. 3. Even though a portion of the outer panel 90 has moved fully away from the vent door 100, carrying with it the first end portion 112 of the tether 110, the second end portion 114 of the tether remains relatively close to the vent door because of contact with a vehicle occupant 62. Because the intermediate portion 120 of the tether 110 is slidable about the pin 122 of the vent door 100, the movement of the first end portion 112 of the tether away from the vent door causes the distance between the first end portion 112 and the vent door to increase and the distance between the second end portion 114 and the vent door to decrease. The distance between the first end portion 112 of the tether 100 and the vent door 100 varies in inverse relationship to the distance between the second end portion 114 of the tether and the vent door. The movement of the tether 110 therefore does not cause the tether to be tensioned sufficiently to move the vent door. The vent opening 94 remains uncovered, enabling venting of inflation fluid away from the air bag 70.

The tether 110 is thus operative to cause the vent door 100 to move so as to close the vent opening 94 only in response to movement of the first and second tether end portions 112 and 114 away from the vent door by a combined amount in excess of a predetermined amount. That is, the vent door 100 is closed only when the air bag 70 is deployed in a manner such that the combined distances between (a) the first part 112 of the tether 100 and the vent door and between (b) the second part 114 of the tether and the vent door substantially equal the length of the tether between the first and second parts 112 and 114.

Figure 5:
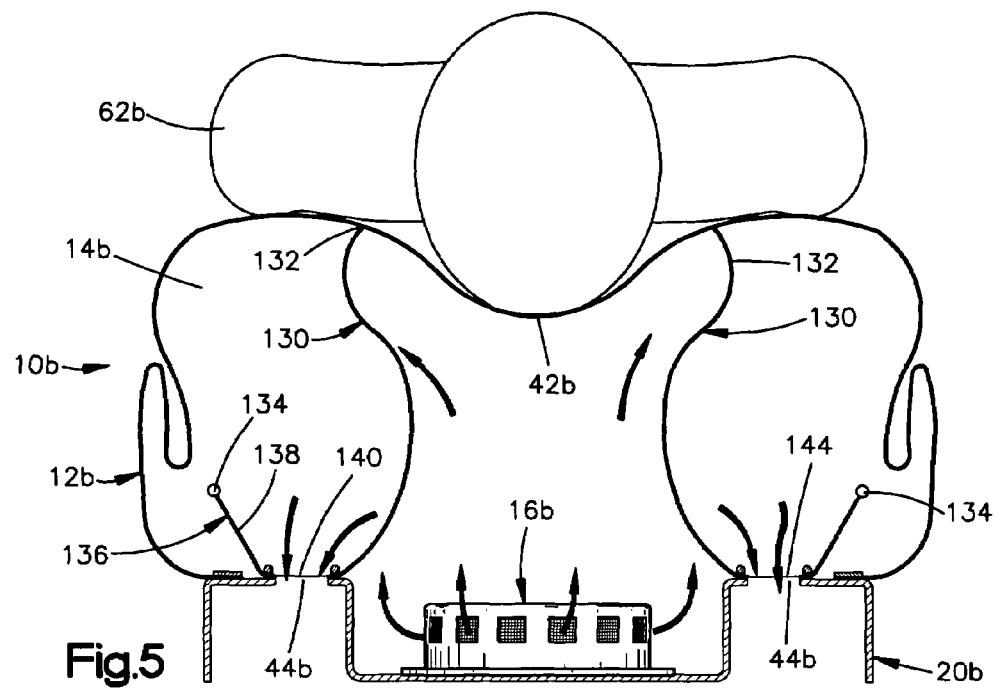
FIG. 5 is a sectional view of a portion of a vehicle occupant protection apparatus including an inflatable passenger side protection device and a vent in accordance with a third embodiment of the present invention, with the vent being open.
Figure 6:
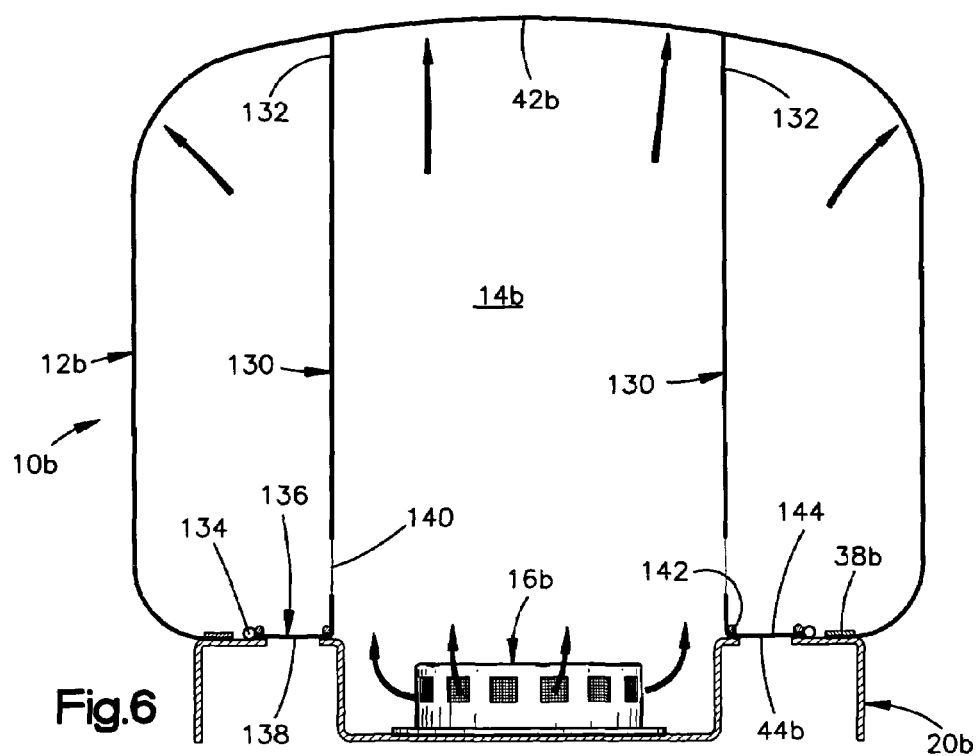
FIG. 6 is a view similar to FIG. 5 showing the protection apparatus with the vent closed.

FIGS. 5 and 6 illustrate an air bag module 10b in accordance with a third embodiment of the invention. Portions of the air bag module 10b that are the same as or similar to corresponding portions of the air bag module 10 (FIGS. 1-2) are given the same reference numerals with the suffix "b" added.

The module 10b includes an air bag 12b and two identical tethers 130. Each tether 130 has a first end portion 132 that is fixed to the outer panel 42b of the air bag 12b by sewing. An opposite second end portion 134 of each tether 130 is formed as a stop member. Adjacent each stop member 134 is a vent member 136. The vent member 136 includes a solid tether portion 138 and a vent opening 140.

The vent member 136 may be formed as one piece with the tether 130, as shown in FIGS. 5 and 6, including the first end portion 132 and the stop member 134. Alternatively, the vent member 136 may be formed as a separate member attached to the tether 130.

The module 10b includes a tether retainer 142 fixed to the reaction plate 20b, overlying the vent opening 44b in the reaction plate. The tether retainer 142 includes a third vent opening 144 that is aligned with the vent opening 44b in the reaction plate 20b. The vent member 136 is slidable through the tether retainer 142, relative to the reaction plate 20b.

When the air bag 12b is in a deflated condition (not shown), the outer panel 42b of the air bag is close to or adjacent the reaction plate 20b. There is a significant amount of slack in the tethers 130. The vent openings 140 in the vent members 136 are aligned with the vent openings 44b in the reaction plate 20b. As a result, inflation fluid may be able to flow away from the air bag 12b through the vent openings 44b.

When the air bag 12b is inflated, the outer panel 42b of the air bag moves away from the reaction plate 20b and the vent openings 44b. If the air bag 12b inflates by less than a certain amount (FIG. 5), the outer panel 42b moves away from the reaction plate 20b by less than a predetermined amount. This might happen, for example, if the air bag 12b when inflating contacts a vehicle occupant (as shown schematically at 62b in FIG. 5) positioned relatively close to the reaction plate 20b.

The engagement of the air bag 12b with the vehicle occupant 62b stops or limits outward movement of the outer panel 42b of the air bag. The tethers 130 are not stretched out sufficiently to remove the slack from the tethers. The tethers 130 do not pull the vent members 136 through the tether retainer 142, and the vent members 136 remain in the first condition. The vent openings 140 in the vent members 136 are aligned with the vent openings 44b in the reaction plate 20b, enabling flow of inflation fluid away from the air bag 12b through the vent openings. This venting of the air bag 12b can reduce the force and pressure with which the air bag inflates.

If the air bag 12b inflates by more than a certain amount (FIG. 6), the outer panel 42b moves away from the reaction plate 20b by a predetermined amount. Such movement might occur if the air bag inflates fully to help protect a vehicle occupant seated against the vehicle seat back. This movement of the outer panel 42b away from the reaction plate 20b by the predetermined amount causes the tethers 130 to be tensioned, as shown in FIG. 6. The slack is pulled out of the tethers 130. The vent members 136 are pulled through the tether retainer 142 to a second condition in which the solid tether portions 138 of the vent members 136 overlie the vent openings 44b in the reaction plate 20b. The vent openings 44b are closed, blocking flow of inflation fluid away from the air bag 12b through the vent openings. The air bag 12b inflates with full force and pressure.

FIG. 7 illustrates an air bag module 10c in accordance with a fourth embodiment of the invention. Portions of the air bag module 10c that are the same as or similar to corresponding portions of the air bag module 10 of FIGS. 1 and 2 are given the same reference numerals with the suffix "c" added.

The air bag module 10c illustrated in FIG. 7 is a driver side frontal air bag module that includes an air bag 12c and an inflator 16c for inflating the air bag. The air bag 12c has an inflation fluid volume 14c. The inflator 16c is actuatable for providing inflation fluid for inflating the air bag 12c.

The inflator 16c and the air bag 12c are supported on a support member 20c. The support member 20c is a member or assembly that is secured to the vehicle and that receives the reaction forces of the inflator 16c and the air bag 12c when the inflator is actuated. In the illustrated embodiment, the support member 20c is a reaction plate.

The reaction plate 20c is a single piece of material, such as metal or high strength plastic, that is formed to the illustrated configuration. The reaction plate 20c has an annular main body portion 22c centered on an axis 24c. An outer wall 26c of the reaction plate 20c extends downward, as viewed in FIG. 7, from the main body portion 22c. A cylindrical inner wall 28c of the reaction plate 20c extends downward, again as viewed in FIG. 7, from the main body portion 22c in a direction parallel to the outer wall 26c at a location spaced radially inwardly from the outer wall. A circular center wall 30c caps the inner wall 28c of the reaction plate 20c.

The inner wall 28c and the center wall 30c of the reaction plate 20c define a cylindrical inflator mounting chamber 32c. The inflator 16c is located in the chamber 32c and is secured to the reaction plate 20c in a known manner. The inner wall 28c and the outer wall 26c of the reaction plate 20c define a toroidal vent chamber 34c of the reaction plate. The toroidal vent chamber 34c is located radially outwardly of the inflator mounting chamber 32c.

A bag retainer 38c secures a mouth portion 36c of the air bag 12c to the main body portion 22c of the reaction plate 20c. The mouth portion 36c of the air bag 12c defines an inflation fluid opening for receiving inflation fluid from the inflator 16c. The inflation fluid opening allows inflation fluid to flow from the inflator 16c into the inflation fluid volume 14c of the air bag 12c when the inflator is actuated. Opposite the mouth portion 36c, the air bag 12c has an outer panel 42c. The outer panel 42c moves away from the reaction plate 20c as the air bag is inflated.

Two diametrically opposed vent openings 44c are formed in the main body portion 22c of the reaction plate 20c. The vent openings 44c are located radially inwardly of the mouth portion 36c of the air bag 12c. The vent openings 44c in the air bag module 10c illustrated in FIG. 7 are identical. A number of vent openings 44c other than two may be provided. The vent openings, when multiple vent openings are provided, may have different configurations from one other. Each of the vent openings 44c of FIG. 7 has a generally rectangular configuration.

The air bag module 10c also includes two vent members 46c. Each one of the vent members 46c is associated with a respective one of the vent openings 44c. The two vent members 46c illustrated in FIG. 7 are identical to one another.

FIG. 9 is a plan view of one of the vent members 46c of the air bag module of FIG. 7. The vent member 46c shown in FIG. 9 is generally planar and has a generally rectangular configuration. The vent member 46c includes opposite upper and lower surfaces 202 and 204, respectively. FIG. 9 only illustrates the upper surface 202 of the vent member 46c. FIGS. 7 and 8 illustrate both the upper and the lower surfaces 202 and 204 of one of the vent members 46c.

As shown in FIG. 9, the vent member 46c includes an attaching portion 208 and a closing portion 210. A living hinge 212 separates the attaching portion 208 and the closing portion 210. The living hinge 212 is formed by two collinear, elongated slots 214 that extend through the vent member 46c and define three hinge portions 218. The living hinge 212 enables bending of the closing portion 210 of the vent member 46c relative to the attaching portion 208.

The attaching portion 208 of the vent member 46c includes three apertures 222. Each aperture 222 is adapted for receiving an associated fastener for fixing the attaching portion 208 of the vent member 46c to the main body portion 22c of the reaction plate 20c. FIGS. 7 and 8 illustrate a portion of a rivet 226 that secures the attaching portion 208 of the vent member 46c to the main body portion 22c of the reaction plate 20c. Fasteners other than rivets may also be used for securing the attaching portion 208 of the vent member 46c to the main body portion 22c of the reaction plate 20c. As an alternative to fasteners, the attaching portion 208 of the vent member 46c may be welded to the main body portion 22c of the reaction plate 20c.

The closing portion 210 of the vent member 46c has dimensions that are greater than the dimension of its associated vent opening 44c. A slot 228 extends through the closing portion 210 of the vent member 46c in a location spaced apart from the living hinge 212.

The vent member 46c is preferably stamped from a single sheet of steel. The vent member 46c has a material stiffness sufficient to prevent bending or warping of the vent member due to vibrations or temperature extremes that are common in vehicles.

As shown in FIGS. 7 and 8, when the vent member 46c is attached to the main body portion 22c of the reaction plate 20c, the vent member 46c is located in the toroidal vent chamber 34c of the reaction plate 20c. The attaching portion 208 of the vent member 46c is secured to the reaction plate 20c in a location for positioning the closing portion 210 across its associated vent opening 44c. Thus, when the vent member 46c is positioned as shown in FIG. 7, the closing portion 210 closes its associated vent opening 44c. When the closing portion 210 of the vent member 46c closes its associated vent opening 44c, as is shown in FIG. 7, the vent member is said to be in a first condition.

The vent member 46c also has a second condition. FIG. 8 illustrates the vent member in the second condition. In the second condition, the vent member 46c is bent at the living hinge 212 so that the closing portion 210 of the vent member 46c is spaced apart from its associated vent opening 44c in the reaction plate 20c. When the vent member 46c is in the second condition, its associated vent opening 44c is open so that fluid may flow through the vent opening.

The air bag module 10c also includes two tethers 50c. Each of the tethers 50c is associated with a different one of the vent members 46c. Each tether 50c has a first end portion 52c that is fixed to the outer panel 42c of the air bag 12c by sewing. The first end portion 52c of the tether 50c is thus connected for movement with the outer panel 42c of the air bag 12c as the air bag is inflated. An opposite second end portion 56c of each tether 50c is attached to the associated vent member 46c. To connect the second end portion 56c to its associated vent member 46c, the second end portion 56c is inserted through the slot 228 in the closing portion 210 of the vent member 46c from the upper surface 202 to the lower surface 204 and is knotted at a location below the lower surface. As an alternative to being knotted, the second end portion 56c of the tether 50c may be connected with an element, such as a washer (not shown), having dimensions greater than the dimensions of the slot 228. When the second end portion 56c of the tether 50c extends through the slot 228, fluid flow through the slot 228 is essentially prevented. Other methods of connecting the second end portion 56c to the closing portion 210 of the vent member 46c are also contemplated by this invention. For example, a fastener (not shown) may connect the second end portion 56c of the tether 50c to the closing portion 210 of the vent member 46c.

The air bag module 10c also includes a cover 240. The cover 240 includes an outer panel 242 and an annular side panel 244. The outer panel 242 of the cover 240 includes a tear seam 248 that ruptures to enable deployment of the air bag 12c from the air bag module 10c. The side panel 244 of the cover 240 extends perpendicularly from the outer panel 242. A lower portion of the side panel 244 is located radially outwardly of the outer wall 26c of the reaction plate 20c. A plurality of fasteners 250, two of which are shown in FIG. 7, attached the side panel 244 of the cover 240 to the outer wall 26c of the reaction plate 20c.

A chamber 254 is defined in the air bag module 10c between the cover 240 and the reaction plate 20c. When the air bag module 10c is in a non-actuated condition, as shown in FIG. 7, the deflated air bag 12c is folded and stored in the chamber 254. When stored in the chamber 254, the outer panel 42c of the air bag 12c is adjacent the outer panel 242 of the cover 240. Also when the air bag module 10c is in the non-actuated condition, there is a significant amount of slack in the tethers 50c. The slack is present because the length of each tether 50c is greater than the distance between the portion of the air bag 12c where the first end portion 52c of the tether is fixed to the outer panel 42c and the vent member 46c where the second end portion 56c of the tether is located. The slack is provided by intermediate portions 58c of the tethers 50.

When the air bag module 10c is in the non-actuated condition, as is shown in FIG. 7, the vent members 46c are in the first condition closing their associated vent openings 44c. When the vent members 46c are in the first condition, debris and other foreign matter are prevented from entering the chamber 254 of the air bag module 10c through the vent openings 44c. The vent members 46c of the air bag module 10c are in the first condition prior to actuation of the inflator 16c.

When the inflator 16c of the air bag module 10c is actuated, inflation fluid exits the inflator 16c and begins to fill the air bag 12c. In response to receiving inflation fluid from the inflator 16c, the air bag 12c expands slightly within the chamber 254 and begins to press against the outer panel 242 of the cover 240. As additional inflation fluid enter the air bag 12c, the pressure within the air bag 12c increases. The pressure within the air bag 12c acts on the upper surfaces 202 of the vent members 46c. Since the lower surfaces 204 of the vent members 46c are subject to atmospheric pressure, a pressure differential arises across the closing portion 210 of each vent member 46c. When the pressure differential reaches a predetermined level, each vent member 46c bends at its living hinge 212 and the closing portion 210 moves away from the vent opening 44c. Thus, in response to the pressure differential, the vent members 46c move from the first condition, shown in FIG. 7, to the second condition, shown in FIG. 8. When the vent members 46c are in the second condition, inflation fluid may flow out of the chamber 254 through the vent openings 44c.

At the point of air bag deployment illustrated in FIG. 8, the output of inflation fluid from the inflator 16c is greater than the amount of inflation fluid that may exit the air bag 12c through the vent openings 44c. As a result, the pressure within the air bag 12c continues to increase after the vent members 46c are moved to the second condition. The increasing pressure in the air bag 12c results in an increasing pressure applied to the outer panel 242 of the cover 240. The increasing pressure applied to the outer panel 242 of the cover 240 eventually ruptures the tear seam 248 of the outer panel of the cover and enables the air bag 12c to expand outward of the chamber 254 of the air bag module 10c.

FIGS. 10 and 11 illustrate the air bag 12c expanded outward of the chamber 254 of the air bag module 10c. FIG. 10 illustrates the air bag 12c partially expanded with the outer panel 42c having moved away from the reaction plate 20c by less than the predetermined distance. FIG. 11 illustrates the air bag 12c near full expansion with the outer panel 42c having moved away from the reaction plate 20c by more than the predetermined distance. For ease of illustration, the cover 240 is not shown in FIGS. 10 and 11.

As the air bag 12c inflates, the outer panel 42c of the air bag 12c moves away from the reaction plate 20c and away from the vent members 46c. If the outer panel 42c moves away from the reaction plate 20c by less than the predetermined distance, slack remains in the tethers 50c. The outer panel 42c of the air bag 12c may move away from the reaction plate 20c by less than the predetermined distance, for example, if the air bag 12c when inflating engages a vehicle occupant (as shown schematically at 62c in FIG. 10) who is positioned relatively close to the reaction plate 20c. The engagement of the air bag 12c with the relatively close vehicle occupant 62c stops or limits the movement of the outer panel 42c of the air bag away from the reaction plate 20c and away from the vent members 46c.

When slack remains in the tethers 50c as a result of the outer panel 42c moving away from the reaction plate 20c by less than the predetermined distance, the tethers 50 do not pull on the vent members 46c. The vent members 46c remain in the second condition, spaced apart from the vent openings 44c. The vent openings 44c remain open, enabling the flow of inflation fluid away from the air bag 12c through the vent openings and to atmosphere. This venting of the air bag 12c can reduce the force and pressure with which the air bag inflates.

When the outer panel 42c of the air bag 12c moves away from the reaction plate 20c by more than the predetermined amount, as is shown in FIG. 11, the slack is completely removed from the tethers 50c and the tethers are tensioned. The tensioned tethers 50c pull the vent members 46c from the second condition, shown in FIG. 10, back toward the first condition in which the vent members 16c block the flow of inflation through the vent openings 44c. When the vent members 46c are moved back into the first condition during inflation of the air bag 12c, the air bag 12c inflates with full force and pressure.

Although not illustrated in FIG. 11, the lengths of the two tethers 50c may be different from one another. As a result, one of the two vent members 46c will be moved back to the first condition prior to the other of the two vent members. Such a design may provide greater control over the fluid flow out of the air bag 12c through the vent openings 44c.

FIG. 12 illustrates an air bag module 10d in accordance with a fifth embodiment of the invention. The air bag module 10d illustrated in FIG. 12 is a frontal air bag module for a passenger side of a vehicle (not shown). The air bag module 10d includes an air bag 300 and an inflator 302 for inflating the air bag.

The air bag 300 has an inflation fluid volume 304 (FIGS. 14 and 15). A mouth portion 306 of the air bag 300 defines an opening through which inflation fluid flows when passing into the inflation fluid volume 304 of the air bag. Multiple fastener holes (not shown) extend through the mouth portion 306 of the air bag 300. The air bag 300 also includes an outer panel 308 and side panels 310. The outer panel 308 and the side panels 310 may be different portions of a single piece of material or may be separate pieces of material that are sewn together to form the air bag 300.

The inflator 302 is actuatable for providing inflation fluid for inflating the air bag 300. The inflator 302 may comprise a quantity of ignitable gas-generating material, a quantity of stored gas under pressure, a combustible mixture of gases, or a quantity of stored gas together with pyrotechnic material for heating the stored gas. The inflator 302 illustrated in FIG. 12 is generally cylindrical.

The inflator 302 and the air bag 300 are mounted to a support member 316 of the air bag module 10d. The support member 316 is securable to the vehicle and receives reaction forces from the inflator 302 and the air bag 300 when the inflator is actuated and the air bag is inflated. In the illustrated embodiment, the support member 316 is a module housing.

The module housing 316 may be formed from metal, high strength plastic, or some other suitable high strength material. The module housing 316 includes a C-shaped main body portion 318 and opposite side wall portions (not shown). The side wall portions attach to and close laterally opposite sides of the main body portion 318. When the side wall portions are attached to the main body portion 318, a chamber 320 is defined within the module housing 316.

The main body portion 318 of the module housing 316 includes an end wall 326 and opposite upper and lower walls 322 and 324, respectively. As shown in FIG. 12, the end wall 326 includes a central portion 328 that separates upper and lower portions 330 and 332, respectively. The central portion 328 of the end wall 326 extends away from the upper and lower walls 322 and 324 of the main body portion 318 of the module housing 316 along a central axis A of the module housing.

As shown in FIG. 12, the upper wall 322 of the main body portion 318 of the module housing 316 extends away from the upper portion 330 of the end wall 326. While extending away from the upper portion 330 of the end wall 326, the upper wall 322 extends away from axis A. Thus, the greater the distance from the upper portion 330 of the end wall 326, the greater the distance between the upper wall 322 and axis A. The upper wall 322 terminates opposite the end wall 326 with an end portion 334. The end portion 334 of the upper wall 322 includes a radial portion 336 and an axial portion 338. The radial portion 336 extends away from axis A and is oriented generally perpendicular to axis A. Multiple fastener holes (not shown) extend through the radial portion 336 of the end portion 334 of the upper wall 322. The axial portion 338 of the end portion 334 extends away from the radial portion 336 and is oriented in a direction generally parallel to axis A, as shown in FIG. 12.

Also, as shown in FIG. 12, the lower wall 324 of the main body portion 318 of the module housing 316 extends away from the lower portion 332 of the end wall 326. While extending away from the lower portion 332 of the end wall 326, the lower wall 324 extends away from axis A. Thus, the greater the distance from the lower portion 332 of the end wall 326, the greater the distance between the lower wall 324 and axis A. The lower wall 324 terminates opposite the end wall 326 with an end portion 342. The end portion 342 of the lower wall 324 includes a radial portion 344 and an axial portion 346. The radial portion 344 extends away from axis A and is oriented generally perpendicular to axis A. Multiple fastener holes (not shown) extend through the radial portion 344 of the end portion 342 of the lower wall 324. The axial portion 346 of the end portion 342 extends away from the radial portion 344 and is oriented in a direction generally parallel to axis A, as shown in FIG. 12.

A vent opening 350 extends through the lower wall 324 of the module housing 316. The vent opening 350 has a generally rectangular configuration. A portion of the lower wall 324 extends out of the plane of the lower wall and into the chamber 320 to form the vent opening 350. The portion of the lower wall 324 that extends into the chamber 320 forms a tether guide member 352. The tether guide member 352 includes a curved guide surface 354.

The air bag module 10d also includes a vent member 360. The vent member 360 is associated with the vent opening 350. The vent member 360 has upper and lower surfaces 362 and 364, respectively, as viewed in FIG. 12. The upper and lower surfaces 362 and 364 are generally rectangular and extend parallel to one another. The upper and lower surfaces 362 and 364 both have an area larger than the area of the vent opening 350. A through-hole 366 extends through the vent member 360 from the upper surface 362 to the lower surface 364.

A hinge 370 is associated with the vent member 360. The hinge 370 includes first and second portions 372 and 374, respectively, that are pivotable relative to one another. The first portion 372 of the hinge 370 is attached to the lower surface 364 of the vent member 360. The second portion 374 of the hinge 370 is attached to a spacer block 376 that is fixed to the outer surface of the lower wall 324 of the module housing 316 at a location adjacent the vent opening 350 for enabling the vent member to close the vent opening, as is shown in FIG. 12. The hinge 370 illustrated in FIG. 12 is similar to a piano hinge. The hinge 370 may include a spiral spring or may have an inherent resistance to movement that is sufficient to overcome gravitational effects on the vent member 360.

The air bag module 10d also includes a bag retainer 378. The bag retainer 378 secures the mouth portion 306 of the air bag 300 to the module housing 316. The bag retainer 378 is generally rectangular and includes upper and lower rails 380 and 382, respectively, and opposite side rails (not shown). Multiple fasteners (not shown) extend into each of the rails 380 and 382 of the bag retainer 378.

The bag retainer 378 is sized to fit in the chamber 320 of the module housing 316 so that the upper rail 380 is received in the end portion 334 of the upper wall 322 and the lower rail 382 is received in the end portion 342 of the lower wall 324. A rectangular opening extends through the center of the bag retainer 378.

The air bag module 10d of FIG. 12 also includes a tether 386 and a tether locking member 388. The tether 386 has a first end portion 390 that is fixed to the outer panel 308 of the air bag 300, such as by sewing. The first end portion 390 of the tether 386 thus is connected for movement with the outer panel 308 of the air bag 300. An opposite second end portion 392 of the tether 386 extends through the through-hole 366 in the vent member 360 from the upper surface 362 to the lower surface 364. The second end portion 392 of the tether 386 is connected below the lower surface 364 of the vent member 360 to a spherical member 394 that is too large to pass through the through-hole 366 and that transfers forces from the tether to the vent member.

The tether locking member 388 is a resilient, one-piece structure that includes a base portion 398 and a lock portion 400. The lock portion 400 of the tether locking member 388 is oriented at an obtuse angle relative to the base portion 398. As shown in FIG. 12, the base portion 398 of the tether locking member 388 is attached to the lower wall 324 of the module housing 316 at a location adjacent the vent opening 350 and within the chamber 320 of the module housing. An end of the lock portion 400 of the tether locking member 388 opposite the base portion 398 terminates adjacent the guide surface 354 of the tether guide member 352. The tether locking member 388 cooperates with the tether guide member 352 to prevent movement of the tether 386 downward, as viewed in FIG. 12, between the tether locking member and the tether guide member. The tether locking member 388 bends upwardly, as viewed in FIG. 12, to enable movement of the tether 386 upward between the tether locking member and the tether guide member 352.

The air bag module 10d also includes a cover 404. The cover 404 includes an outer panel 406 (FIG. 12) and side panels 408. The outer panel 406 of the cover 404 includes a tear seam 410 that ruptures to enable deployment of the air bag 300 from the air bag module 10d. The side panels 408 of the cover 404 extend over the end portions 334 and 342 of the upper and lower walls 322 and 324 of the module housing 316 and are attached to the end portions of the upper and lower walls. In the air bag module 10d illustrated in FIG. 12, fasteners 412 extend through fastener holes in the side panels 408 of the cover 404, the module housing 316, and the air bag 300 and are secured in the fastener holes of the bag retainer 378 for attaching the cover, the air bag, and the bag retainer to the module housing.

When the air bag module 10d is in the non-actuated condition, as is shown in FIG. 12, the air bag 300 is folded and stored in the chamber 320 of the module housing 316 and the vent member 360 is in a first condition closing the vent opening 350. When the vent member 360 is in the first condition, debris and other foreign matter are prevented from entering the chamber 320 through the vent opening 350. The vent member 360 of the air bag module 10d is in the first condition prior to actuation of the inflator 302.

When the inflator 302 of the air bag module 10d is actuated, inflation fluid exits the inflator 302 and begins to fill the chamber 320 and the air bag 300. In response to receiving inflation fluid from the inflator 302, the air bag 300 expands slightly within the chamber 320 and begins to press against the outer panel 406 of the cover 404. As additional inflation fluid enters the chamber 320 and the air bag 300, the pressure within the chamber 320 and within the air bag 300 increases. The pressure within the chamber 320 acts on the upper surface 362 of the vent member 360. Since the lower surface 364 of the vent member 360 is subject to atmospheric pressure, a pressure differential arises across the vent member 360. When the pressure differential reaches a predetermined level, the vent member 360 pivots downwardly, as viewed in FIG. 12, and away from the vent opening 350. Thus, in response to the pressure differential, the vent member 360 moves from the first condition, shown in FIG. 12, to a second condition, shown in FIG. 13.

The portion of the tether 386 that is located between the end of the lock portion 400 of the tether locking member 388 and the vent member 360 controls the location of the vent member when in the second condition. During pivotal movement away from the vent opening 350, the distance between the end of the lock portion 400 and the through-hole 366 of the vent member 360 increases. As this distance increases, the portion of the tether 386 located between the end of the lock portion 400 and the vent member 360 is pulled taut. When the portion of the tether 386 is taut, as is shown in FIG. 13, further pivotal movement of the vent member 360 is prevented.

Generally, when the vent member 360 is in the second condition, the vent member 360 provides no restriction to the flow of inflation fluid out of the chamber 320 through the vent opening 350. To ensure that the vent member 360, when in the second condition, does not restrict the flow of inflation fluid out of the chamber 320 through the vent opening 350, the length of the portion of the tether 386 located between the end of the lock portion 400 of the tether locking member 388 and the vent member 360 is chosen to allow the vent member to open to an angle at which the flow area between the vent member and the module housing 316 is greater than the flow area of the vent opening 350. The angle of the vent member 360 for ensuring that the flow area between the vent member and the module housing 316 is greater than the flow area of the vent opening 350, when the vent member is rectangular, may be determined by the following equation:

$$V \leq L \sin(B)(W + L \cos(B))$$

wherein V is the flow area of the vent opening 350, W is the width of the vent member (into and out of the plane of the paper in FIG. 13), L is the length of the vent member (as shown in FIG. 13), and B is the angle of the vent member 360 relative to the plane of the lower wall 324 of the module housing 316 through which the vent opening 350 extends.

After the vent member 360 has been moved to the second condition, the output of inflation fluid from the inflator 302 is greater than the amount of inflation fluid that may exit the chamber 320 through the vent opening 350. As a result, the pressure within the chamber 320 and the air bag 300 continues to increase. The increasing pressure results in an increasing force being applied by the air bag 300 to the outer panel 406 of the cover 404. The increasing force applied to the outer panel 406 of the cover 404 eventually ruptures the tear seam 410 of the outer panel of the cover and enables the air bag 300 to expand outward of the chamber 320 of the air bag module 10d.

As the air bag 300 inflates, the outer panel 308 of the air bag 300 moves away from the module housing 316. If the outer panel 308 moves away from the module housing 316 by less than a predetermined distance, slack remains in the tether 386. The outer panel 308 of the air bag may 300 move away from the module housing 316 by less than the predetermined distance if, for example, the air bag when inflating engages a vehicle occupant (not shown) who is positioned relatively close to the air bag module 10d. The engagement of the air bag 300 with the relatively close vehicle occupant stops or limits the movement of the outer panel 308 of the air bag 300 away from the module housing 316.

When slack remains in the tether 386 as a result of the outer panel 308 moving away from the module housing 316 by less than the predetermined distance, the tether 386 does not pull on the vent member 360. The vent member 360 remains in the second condition, spaced apart from the vent opening 350. The vent opening 350 remains open, enabling the flow of inflation fluid away from the air bag 300 through the vent opening and to atmosphere. This venting of the air bag 300 can reduce the force and pressure with which the air bag inflates.

FIGS. 14 and 15 illustrate the air bag 300 expanded outward of the chamber 320 of the air bag module 10d. For ease of illustration, the outer panel 406 of the cover 404 is not shown in FIGS. 14 and 15. FIG. 14 illustrates the air bag 300 prior to reaching a fully expanded condition with the outer panel 308 of the air bag having moved away from the module housing 316 by more than the predetermined distance. As shown in FIG. 14, the tether 386 is pulled taut and tension in the tether is acting on the vent member 360 to move the vent member from the second condition back toward the first condition. When moving the vent member 360 from the second condition back toward the first condition, the tether 386 moves upwardly, as viewed in FIG. 14, between the lock portion 400 of the tether locking member 388 and the tether guide member 352. The tether locking member 388 and the tether guide member 352 cooperate to allow this upward movement of the tether 386 and to prevent any subsequent downward movement, as viewed in FIG. 14, of the tether between the tether locking member 388 and the tether guide member 352. Thus, the tether locking member 388 and the tether guide member 352 act to lock the vent member 360 against movement toward the second condition after the vent member has been moved from the second condition toward the first condition.

FIG. 15 illustrates the air bag 300 in a fully expanded condition. When the air bag 300 is in the fully expanded condition, the vent member 360 is moved back into the first condition closing the vent opening 350. In the embodiment illustrated in FIG. 15, the tether 386 is approximately one inch shorter than the distance from the closed vent member 360, over the tether guide member 352, and to the location of the outer panel 308 of the air bag 300 when in the fully expanded condition. This slightly shorter tether 386 ensures that the vent member 360 is moved back into the first condition when the air bag 300 reaches the fully expanded condition. As shown in FIG. 15, a small dimple 416 is created in the outer panel 308 of the air bag 300 at the location on the outer panel at which the first end portion 390 of the tether 386 is attached when the air bag is in the fully expanded condition. When the vent member 360 is moved back into the first condition, shown in FIG. 15, during inflation of the air bag 300, the air bag 300 inflates with full force and pressure.

Figure 16:
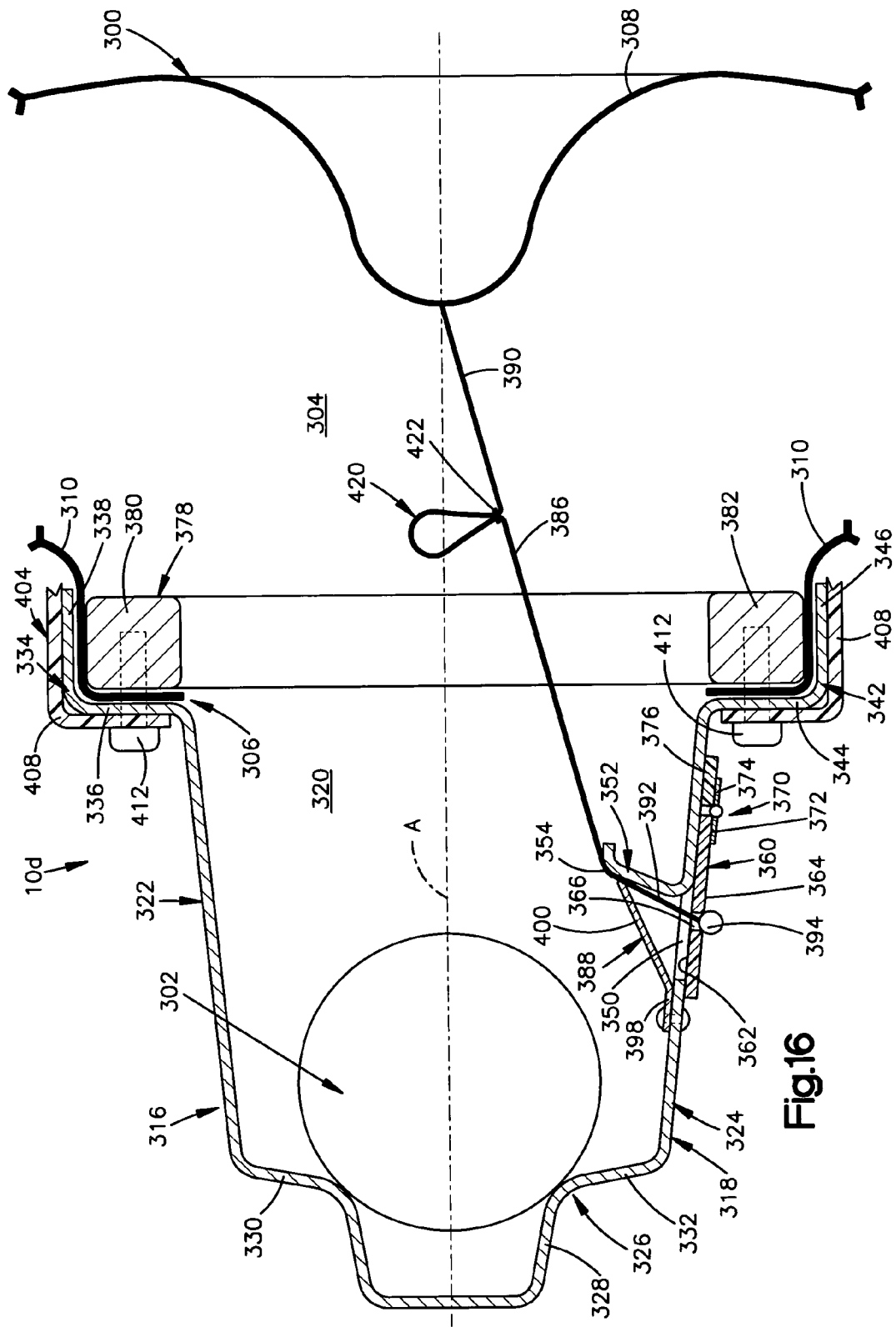
FIG. 16 illustrates an alternative configuration for a tether of the vehicle occupant protection apparatus of FIG. 12.

FIG. 16 illustrates an alternative configuration for a tether 386 of the vehicle occupant protection apparatus 10d of FIG. 12. Features of FIG. 16 that are the same as or similar to those of FIGS. 12-15 are labeled using the same reference numbers as used in FIGS. 12-15. A loop 420 is formed in the tether 386 to shorten the length of the tether. The loop 420 is formed by stitching together two spaced apart portions of the tether 386.

FIG. 16 illustrates the air bag 300 inflated beyond the predetermined distance relative to the module housing 316 and prior to reaching the fully expanded condition. The shortened tether 386 acts to move the vent member 360 from the second condition back to the first condition at an earlier time, as compared to the tether 386 shown and described with reference to FIGS. 12-15. Thus, the length of the tether 386 may be modified for controlling the timing of closure of the vent member 360.

The stitching 422 of the loop 420 of the tether 386 is designed to tear when subjected to a predetermined tension. When the tether 386 has moved the vent member 360 back into the first condition, as is shown in FIG. 16, further inflation of the air bag 300 increases the tension in the tether 386 above the predetermined tension and causes the stitching 422 of the loop 420 to tear. As a result, the air bag 300 has a fully expanded condition that is similar to that illustrated in FIG. 15.

Figure 17:
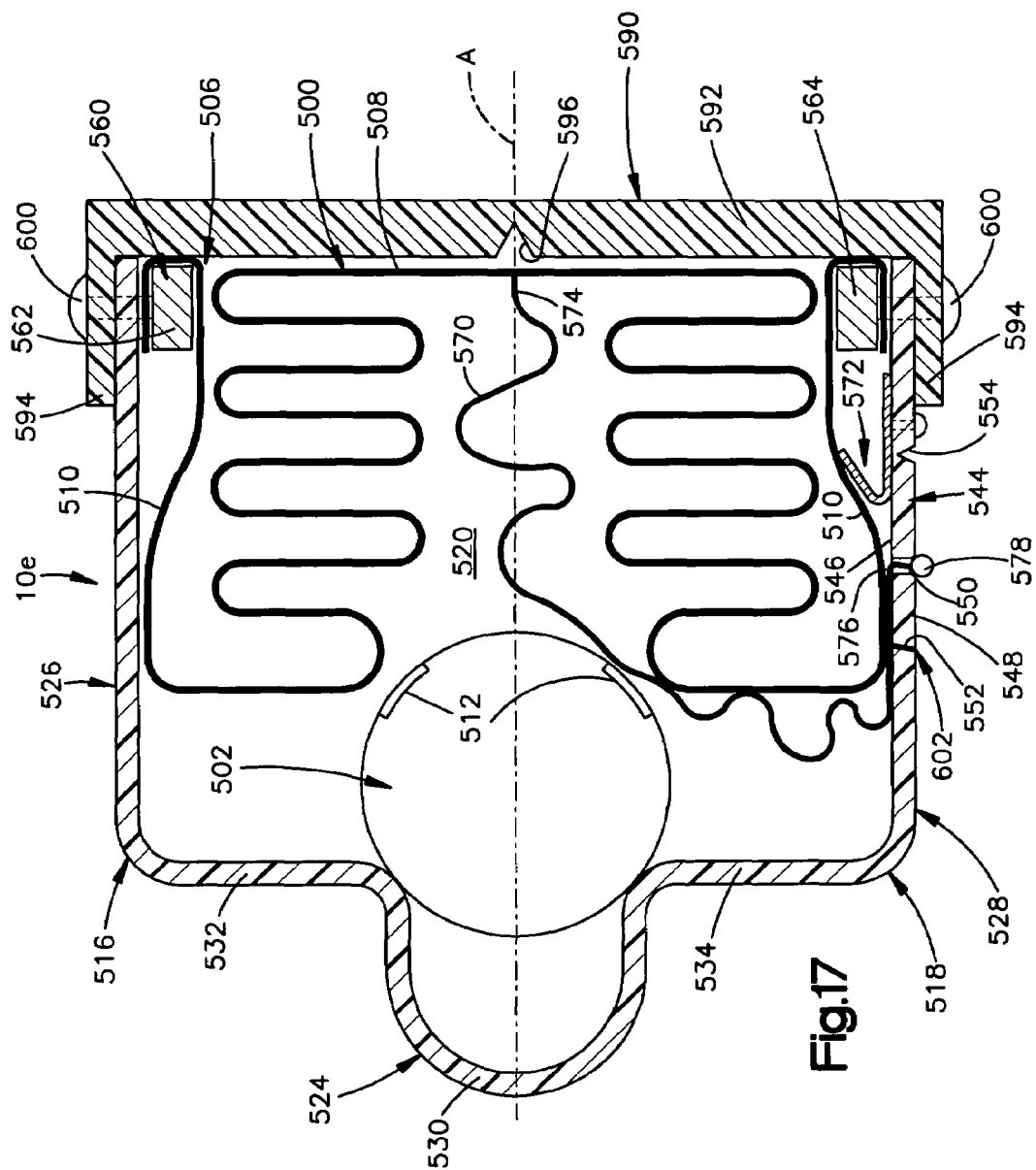
FIG. 17 is a sectional view of a vehicle occupant protection apparatus and a vent in accordance with a sixth embodiment of the present invention, with the vent in a first condition.

FIG. 17 illustrates an air bag module 10e in accordance with a sixth embodiment of the invention. The air bag module 10e illustrated in FIG. 17 is also a frontal air bag module for a passenger side of a vehicle (not shown). The air bag module 10e includes an air bag 500 and an inflator 502 for inflating the air bag.

The air bag 500 has an inflation fluid volume 504 (FIG. 20). A mouth portion 506 of the air bag 500 defines an opening through which inflation fluid flows when passing into the inflation fluid volume 504 of the air bag. Multiple fastener holes (not shown) extend through the mouth portion 506 of the air bag 500. The air bag 500 also includes an outer panel 508 and side panels 510. The outer panel 508 and the side panels 510 may be different portions of a single piece of material or may be separate pieces of material that are sewn together to form the air bag 500.

The inflator 502 is actuatable for providing inflation fluid for inflating the air bag 500. The inflator 502 may comprise a quantity of ignitable gas-generating material, a quantity of stored gas under pressure, a combustible mixture of gases, or a quantity of stored gas together with pyrotechnic material for heating the stored gas. The inflator 502 illustrated in FIG. 17 is generally cylindrical and includes multiple gas exit ports. FIG. 17 schematically illustrates two gas exit ports at 512.

The inflator 502 and the air bag 500 are mounted to a support member 516. The support member 516 is securable to the vehicle and receives the reaction forces from the inflator 502 and the air bag 500 when the inflator is actuated and the air bag is inflated. In the illustrated embodiment, the support member 516 is a module housing.

The module housing 516 may be formed from metal, high strength plastic, or some other high strength material. The module housing 516 includes a C-shaped main body portion 518 and opposite side wall portions (not shown). The side wall portions of the module housing 516 attach to and close laterally opposite sides of the main body portion 518. When the side wall portions are attached to the main body portion 518, a chamber 520 is defined within the module housing 516.

The main body portion 518 of the module housing 516 includes an end wall 524 and opposite upper and lower walls 526 and 528, respectively. As shown in FIG. 17, the end wall 524 includes an arcuate central portion 530 that separates coplanar upper and lower portions 532 and 534, respectively. The central portion 530 of the end wall 524 extends away from the upper and lower walls 526 and 528 along a central axis A of the module housing 516. The upper and lower portions 532 and 534 of the end wall 524 are oriented generally perpendicular to axis A.

As shown in FIG. 17, the upper wall 526 of the main body portion 518 of the module housing 516 extends away from the upper portion 532 of the end wall 524 and is oriented in a direction generally parallel to axis A. Fastener holes (not shown) extend through the upper wall 526 near an end 536 (FIG. 20) of the upper wall opposite the end wall 524. The fastener holes extend in a direction generally perpendicular to axis A.

The lower wall 528 of the main body portion 518 of the module housing 516 extends away from the lower portion 534 of the end wall 524 and is oriented in a direction generally parallel to axis A. Fastener holes (not shown) extend through the lower wall 528 near an end 538 (FIG. 20) of the lower wall opposite the end wall 524. The fastener holes in the lower wall 528 also extend in a direction generally perpendicular to axis A.

A vent member 544 is formed as one piece with the lower wall 528 of the main body portion 518 of the module housing 516 and is not formed from separate pieces secured together. The vent member 544 has upper and lower surfaces 546 and 548, respectively, as viewed in FIG. 17. The upper and lower surfaces 546 and 548 are generally rectangular and extend parallel to one another. A through-hole 550 extends through the vent member 544 from the upper surface 546 to the lower surface 548. The vent member 544 is defined longitudinally along axis A between an outer edge 552 and a living hinge 554. The living hinge 554 is formed by a thinned portion of the lower wall 528.

The vent member 544 is illustrated in FIG. 17 in a first condition. When in the first condition, the vent member 544 is coplanar with the lower wall 528 of the module housing 516. The vent member 544 is pivotable away from the first condition to a second condition, illustrated in FIG. 19, in response to a pressure differential across the vent member. The material properties and the thickness of the lower wall 528 at the living hinge 554 may be adjusted to control the pressure differential required to move the vent member 544 away from the first condition to the second condition. Thus, the living hinge 554 may be tuned for opening the vent member 544 at a desired pressure differential.

When the vent member moves 544 away from the first condition, a vent opening 558 (FIG. 19) is formed in the lower wall 528 of the module housing 516. The vent opening 558 has a generally rectangular configuration. Inflation fluid may flow out of the chamber 520 through the vent opening 558.

The air bag module 10e also includes a bag retainer 560. The bag retainer 560 secures the mouth portion 506 of the air bag 500 to the module housing 516. The bag retainer 560 is generally rectangular and includes upper and lower rails 562 and 564, respectively, and opposite side rails (not shown). The bag retainer 560 is sized to fit in the chamber 520 of the module housing 516 so that the upper rail 562 is adjacent the upper wall 526 and the lower rail 564 is adjacent the lower wall 528. A rectangular opening extends through the center of the bag retainer 560.

The air bag module 10e of FIG. 17 also includes a tether 570 and a tether guide member 572. The tether 570 has a first end portion 574 that is fixed to the outer panel 508 of the air bag 500, such as by sewing. The first end portion 574 of the tether 570 thus is connected for movement with the outer panel 508 of the air bag 500. An opposite second end portion 576 of the tether 570 extends through the through-hole 550 in the vent member 544 from the upper surface 546 to the lower surface 548. The second end portion 576 of the tether 570 is connected below the lower surface 548 of the vent member 544 to a spherical member 578 that is too large to pass through the through-hole 550 and that transfers forces from the tether to the vent member.

As shown in FIG. 19, the tether guide member 572 is a one-piece structure that includes a base portion 580 and a guide portion 582 that curves away from the base portion. The base portion 580 of the tether guide member 572 attaches to the lower wall 528 within the chamber 520 of the module housing 516 at a location between the vent opening 558 and the end 538 of the lower wall 528. The guide portion 582 of the tether guide member 572 includes a curved guide surface for guiding the tether 570 between the outer panel 508 of the air bag 500 and the vent member 544 when the tether is tensioned.

The air bag module 10e also includes a cover 590 (FIG. 17). The cover 590 includes an outer panel 592 and side panels 594. The outer panel 592 of the cover 590 includes a tear seam 596 that ruptures to enable deployment of the air bag 500 from the air bag module 10e. The side panels 594 of the cover 590 extend over portions of upper and lower walls 526 and 528 of the module housing 516 and are attached to the upper and lower walls. In the air bag module 10e illustrated in FIG. 17, fasteners 600 secure the side panels 594 of the cover 590 and the bag retainer 560 to the module housing 516. FIG. 17 illustrates one fastener 600 securing the upper rail 562 of the bag retainer 560 and a side panel 594 of the cover 590 to the upper wall 526 of the module housing 516 and one fastener 600 securing the lower rail 564 of the bag retainer 560 and a side panel 594 of the cover 590 to the lower wall 528 of the module housing 516.

When the air bag module 10e is in the non-actuated condition, as is shown in FIG. 17, the air bag 500 is folded and stored in the chamber 520 of the module housing 516 and the vent member 544 is in a first condition closing the vent opening 558. When the air bag 500 is in the folded and stored condition, a portion of the air bag 500 extends over the vent member 544. FIG. 17 illustrates a side panel 510 of the air bag 500 extending over the vent member 544.

When the inflator 502 of the air bag module 10e is actuated, inflation fluid exits the inflator 502. The exiting inflation fluid is directed into the chamber 520 and against the folded air bag 500. The inflation fluid acts to move the air bag 500 away from the vent member 544 and toward the outer panel 592 of the cover 590, as is illustrated schematically in FIG. 18. As the inflation fluid acts to move the air bag 500 away from the vent member 544 and toward the outer panel 592 of the cover 590, inflation fluid pressure within the chamber 520 and within the air bag 500 increases. After the air bag 500 moves away from the vent member 544, the pressure within the chamber 520 acts on the upper surface 546 of the vent member 544. Since the lower surface 548 of the vent member 544 is subject to atmospheric pressure, a pressure differential arises across the vent member 544. When the pressure differential reaches a predetermined level, the vent member 544 pivots from the first condition to the second condition, illustrated in FIG. 19. When the vent member 544 is in the second condition, inflation fluid may exit the chamber 520 through the vent opening 558.

Covering the vent member 544 with the folded and stored air bag 500 helps to reduce inflation fluid loss from the chamber 520 after the vent member has moved to the second condition. Excessive inflation fluid loss through the vent opening 558 may occur when the vent member 544 is in the second condition prior to the tear seam 596 of the outer panel 592 of the cover 590 opening. The folded air bag 500 temporarily covers the vent opening 558 to prevent this excessive inflation fluid loss. As a result, pressure within the chamber 520 increases at a greater rate than when no portion of the air bag 500 covers the vent opening 558. Covering of the vent opening 558 with the air bag 500 may be particularly helpful for increasing the pressure within the chamber 520 during actuation of the inflator 502 in cold weather conditions.

After the pressure within the chamber 520 has moved the vent member 544 to the second condition, as is shown in FIG. 19, the output of inflation fluid from the inflator 502 is greater than the amount of inflation fluid that may exit the chamber 520 through the vent opening 558. As a result, the pressure within the air bag 500 continues to increase. The increasing pressure in the air bag 500 results in an increasing force applied to the outer panel 592 of the cover 590. The increasing force applied to the outer panel 592 of the cover 590 eventually ruptures the tear seam 596 of the outer panel of the cover and enables the air bag 500 to expand outward of the chamber 520 of the air bag module 10e.

As the air bag 500 inflates, the outer panel 508 of the air bag 500 moves away from the module housing 516. If the outer panel 508 moves away from the module housing 516 by less than a predetermined distance, slack remains in the tether 570. The outer panel 508 of the air bag 500 may move away from the module housing 516 by less than the predetermined distance if, for example, the air bag when inflating engages a vehicle occupant (not shown) who is positioned relatively close to the air bag module 10e. The engagement of the air bag 500 with the relatively close vehicle occupant stops or limits the movement of the outer panel 508 of the air bag 500 away from the module housing 516 and away from the vent member 544.

When slack remains in the tether 570 as a result of the outer panel 508 moving away from the module housing 516 by less than the predetermined distance, the tether 570 does not pull on the vent member 544. The vent member 544 remains in the second condition, spaced apart from the vent opening 558. The vent opening 558 remains open, enabling the flow of inflation fluid away from the air bag 500 through the vent opening 558 and to atmosphere. This venting of the air bag 500 can reduce the force and pressure with which the air bag inflates.

FIG. 19 illustrates the tether 570 in a taut condition. The tether 570 is pulled taut when the outer panel 508 of the air bag 500 has moved away from the module housing 516 by the predetermined distance. When the tether 570 is pulled taut, the tether guide member 572 guides the tether between the vent member 544 and the outer panel 508 of the air bag 500. Continued movement of the outer panel 508 of the air bag 500 away from the module housing 516 beyond the predetermined distance moves the tether 570 across the guide surface of the tether guide member 572 and pulls the vent member 544 from the second condition toward the first condition, i.e., upward, as viewed in FIG. 19.

FIG. 20 illustrates the air bag 500 in a fully expanded condition. For ease of illustration, the outer panel 592 of the cover 590 is not shown in FIG. 20. When the air bag 500 is in the fully expanded condition, the vent member 544 is moved back into the first condition closing the vent opening 558. As can be seen with reference to FIG. 20, the length of the tether 570 is equal to the distance from the closed vent member 544, over the tether guide member 572, and to a location on the outer panel 508 at which the first end portion 574 of the tether 570 is attached. The length of the tether 570 may be shortened for causing vent member 544 to close at an earlier time during expansion of the air bag 500. Additionally, the location at which the tether 570 is attached to the air bag 500 may be adjusted for helping to control the timing of closure of the vent member 544. For example, the tether 570 may be attached to the outer panel 508 of the air bag 500 at a location adjacent a side panel 510 of the air bag that reaches the predetermined distance prior to a central portion of the outer panel. As a result, the vent member 544 will be closed at an earlier time, as compared to when the tether 570 is attached to the central portion of the outer panel 508. When the vent member 544 is returned to the first condition during inflation of the air bag 500, the air bag 500 inflates with full force and pressure.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant protection apparatus comprising:
an inflatable occupant protection device;
a support member having a vent opening extending through the support member;
an inflator that is actuatable for providing inflation fluid for inflating the inflatable occupant protection device;
a vent member associated with the vent opening, the vent member initially closing the vent opening, inflation fluid provided by the inflator moving the vent member relative to the support member for enabling a flow of inflation fluid through the vent opening; and
a tether extending between the inflatable occupant protection device and the vent member, the tether being responsive to inflation of the inflatable occupant protection device away from the support member by more than a predetermined distance for moving the vent member relative to the support member for reducing the flow of inflation fluid through the vent opening.

2. The vehicle occupant protection apparatus of claim 1 wherein the vent member includes a living hinge, a first portion of the vent member being attached to the support member and a second portion of the vent member being pivotal relative to the support member, the living hinge connecting the first and second portions of the vent member.

3. The vehicle occupant protection apparatus of claim 1 wherein the vent member is connected to the support member with a hinge that enables pivotal movement of the vent member relative to the support member.

4. The vehicle occupant protection apparatus of claim 3 wherein the hinge includes first and second portions, the first portion of the hinge being attached to the vent member and the second portion of the hinge being attached to a spacer block at a location adjacent the vent opening.

5. The vehicle occupant protection apparatus of claim 3 wherein the vent member is formed as one piece with the support member and not from separate pieces secured together, the hinge being a living hinge formed in the support member.

6. The vehicle occupant protection apparatus of claim 5 wherein the living hinge is formed from a thinned portion of the support member.

7. The vehicle occupant protection apparatus of claim 6 wherein material properties of the support member and a thickness of the support member at the living hinge may be adjusted for controlling when inflation fluid moves the vent member to enable the flow of inflation fluid through the vent opening.

8. The vehicle occupant protection apparatus of claim 1 wherein the vent member is in a first condition when closing the vent opening, inflation fluid moving the vent member from the first condition to a second condition, the vent member, when in the second condition, being positioned relative to the support member so that a flow area between the vent member and the support member is equal to or greater than a flow area of the vent opening.

9. The vehicle occupant protection apparatus of claim 8 wherein the vent member is rectangular and is pivotable relative to the support member, an angle of the vent member relative to the support member satisfying the equation, $V \leq L \sin(B)(W+L \cos(B))$, wherein V is the flow area of the vent opening, W is a width of the vent member, L is a length of the vent member, and B is the angle of the vent member relative to the support member.

10. The vehicle occupant protection apparatus of claim 8 wherein the tether has a length that returns the vent member to the first condition prior to the inflatable occupant protection device reaching a fully expanded condition.

11. The vehicle occupant protection apparatus of claim 10 wherein the length of the tether and a location at which the tether is attached to the inflatable occupant protection device control the timing, during inflation of the inflatable occupant protection device, at which the vent member returns to the first condition.

12. The vehicle occupant protection apparatus of claim 10 wherein the tether creates a dimple on an outer panel of the inflatable occupant protection device when the inflatable occupant protection device is in the fully expanded condition.

13. The vehicle occupant protection apparatus of claim 10 wherein the tether includes a loop that is formed by stitching together two portions of the tether, stitching of the loop being designed to tear when the tether is subjected to a predetermined tension.

14. The vehicle occupant protection apparatus of claim 1 wherein a portion of the inflatable occupant protection device, when in a folded and stored condition, covers the vent opening.

15. The vehicle occupant protection apparatus of claim 14 wherein inflation fluid provided by the inflator is directed against the inflatable occupant protection device, when in the folded and stored condition, for moving the inflatable occupant protection device away from the vent opening.

16. The vehicle occupant protection apparatus of claim 1 further including a tether guide member for guiding the tether between the inflatable occupant protection device and the vent member.

17. The vehicle occupant protection apparatus of claim 16 wherein the tether guide member is formed as one piece with the support member and not from separate pieces secured together.

18. The vehicle occupant protection apparatus of claim 17 wherein the support member defines a chamber, a portion of the support member being bent into the chamber to form the tether guide member.

19. The vehicle occupant protection apparatus of claim 16 wherein the tether guide member includes a curved guide surface over which the tether, when tensioned, is redirected.

20. The vehicle occupant protection apparatus of claim 1 further including a cover that is attached to the support member, the cover including an outer panel having a tear seam that, when ruptured, enables inflation of the inflatable occupant protection device away from the support member, inflation fluid moving the vent member to enable the flow of inflation fluid through the vent opening prior to the tear seam of the cover rupturing.

21. The vehicle occupant protection apparatus of claim 1 further including a tether locking member for preventing movement of an end of the tether and the vent member away from the support member.

22. The vehicle occupant protection apparatus of claim 21 wherein the tether locking member is a resilient, one-piece structure secured to the support member.

23. The vehicle occupant protection apparatus of claim 22 wherein the tether locking member includes a first portion and a second portion oriented at an obtuse angle relative to the first portion.

24. The vehicle occupant protection apparatus of claim 23 wherein the second portion of the tether locking member bends in order to enable closing of the vent opening by the vent member.

25. The vehicle occupant protection apparatus of claim 1 further including a locking member for, along with the tether, limiting movement of the vent member away from the vent opening.

* * * * *